United States Patent
McTaggart et al.

(10) Patent No.: US 11,583,817 B2
(45) Date of Patent: Feb. 21, 2023

(54) DEVICES AND METHODS OF USING SMALL FORM ALUMINUM IN CONSECUTIVE BATCH ALUMINUM CHLOROHYDRATE PROCESSES

(71) Applicants: C-KOE Metals, L.P., Euless, TX (US); Board of Regents, The University of Texas System, Austin, TX (US)

(72) Inventors: Chase McTaggart, Euless, TX (US); Brian Hodges, Euless, TX (US); Charles Koetting, Euless, TX (US); Frederick M. MacDonnell, Arlington, TX (US); Brian Dennis, Arlington, TX (US); Mark Hulsizer, Euless, TX (US)

(73) Assignees: C-Koe Metals, L.P., Euless, TX (US); The Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/969,874

(22) PCT Filed: Mar. 4, 2019

(86) PCT No.: PCT/US2019/020527
§ 371 (c)(1),
(2) Date: Aug. 13, 2020

(87) PCT Pub. No.: WO2019/169381
PCT Pub. Date: Sep. 6, 2019

(65) Prior Publication Data
US 2020/0398242 A1    Dec. 24, 2020

Related U.S. Application Data

(60) Provisional application No. 62/637,683, filed on Mar. 2, 2018, provisional application No. 62/637,769, filed
(Continued)

(51) Int. Cl.
    *B01J 8/34*    (2006.01)
    *B01J 8/00*    (2006.01)
    (Continued)

(52) U.S. Cl.
    CPC .............. *B01J 8/34* (2013.01); *B01J 8/006* (2013.01); *B01J 8/44* (2013.01); *B01J 19/249* (2013.01);
    (Continued)

(58) Field of Classification Search
    CPC ....... B01J 8/34; B01J 8/006; B01J 8/44; B01J 19/249; B01J 2208/00911; B01J 19/24; C01F 7/56
    (Continued)

(56) References Cited

U.S. PATENT DOCUMENTS 3,340,205 A * 9/1967 Hayes ............... C01F 7/428
                                                   516/93
3,891,745 A    6/1975 Bellan et al.
(Continued)

OTHER PUBLICATIONS

International Search Report and Written Opinion issued in counterpart PCT Application No. PCT/US2019/020527 dated May 15, 2019 (eight (8) pages).

*Primary Examiner* — Huy Tram Nguyen
(74) *Attorney, Agent, or Firm* — E. Eric Mills; Nexsen Pruet, PLLC

(57) ABSTRACT

A method of producing aluminum chlorohydrate comprises adding small form aluminum metal pellets to a reactant receiving space of a reactor tank to form a pellet bed; adding aqueous hydrochloric acid to the reactant receiving space of the reactor tank; and continuously circulating the aqueous hydrochloric acid through the pellet bed. In some embodiments, the continuously circulating aqueous hydrochloric acid dispels reaction gases from the pellet bed. Methods described herein can, in some cases, further comprise con-
(Continued)

secutively adding additional small form aluminum metal pellets to the reactant receiving space of the reactor tank as the small form aluminum metal pellets are consumed in the pellet bed.

25 Claims, 21 Drawing Sheets

Related U.S. Application Data on Mar. 2, 2018, provisional application No. 62/367,725, filed on Mar. 2, 2018.

(51) Int. Cl.
*B01J 19/24* (2006.01)
*B01J 8/44* (2006.01)
*C01F 7/56* (2006.01)

(52) U.S. Cl.
CPC ....... *C01F 7/56* (2013.01); *B01J 2208/00911* (2013.01)

(58) Field of Classification Search
USPC .......................................... 423/113
See application file for complete search history.

(56) References Cited

U.S. PATENT DOCUMENTS

| | | |
|---|---|---|
| 4,267,161 A | 5/1981 | Ziegenhain |
| 5,358,694 A | 10/1994 | Giovanniello |
| 2008/0181840 A1 | 7/2008 | Steelhammer et al. |

\* cited by examiner

DEVICES AND METHODS OF USING SMALL FORM ALUMINUM IN CONSECUTIVE BATCH ALUMINUM CHLOROHYDRATE PROCESSES

CROSS REFERENCE TO RELATED APPLICATIONS

This application is a 35 U.S.C. § 371 U.S. national phase entry of International Application No. PCT/US2019/020527 having an international filing date of Mar. 4, 2019, which claims priority under 35 U.S.C. § 119 to U.S. Provisional Patent No. 62/637,725 filed Mar. 2, 2018, U.S. Provisional Patent No. 62/637,683 filed Mar. 2, 2018, and U.S. Provisional Patent No. 62/637,769 filed Mar. 2, 2018, and the entirety of each is incorporated by reference herein.

FIELD

The invention is generally related to devices and methods of using small form metal pellets, and, more specifically to devices and methods of using small form aluminum metal in the production of aluminum chlorohydrate.

BACKGROUND

An industrial process of producing aluminum chlorohydrate (ACH) generally includes reacting aluminum metal with an aqueous acid, such as hydrochloric acid, as shown in the example equation:

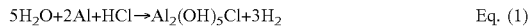

$$5H_2O + 2Al + HCl \rightarrow Al_2(OH)_5Cl + 3H_2 \qquad \text{Eq. (1)}$$

When produced at scale, the reaction is often conducted in a large fiberglass-reinforced plastic (FRP) tank with specialized resin inert to the acid and to extreme heat. This batch process can take anywhere between 1 to 5 days to complete, depending on the scale. While not intending to be bound by theory, it is believed the reaction occurs when an acid encounters the surface area of the aluminum metal. The rate of the reaction is dictated by the aluminum metal surface area, where increasing the surface area correspondingly increases the rate of the reaction. Conventional reactions use large aluminum ingots, such as 30"×6"×5" sized ingots, which often weigh 35 to 50 pounds or more. However, these large aluminum ingots have a limited surface area compared to a total amount of reactive aluminum within the ingot itself.

In conventional processes, a typical tank size can be around 12,000 gallons with a typical batch producing 6000 gallons of 50% ACH solution using around three hundred 50 lb ingots. In this example, the mass of starting aluminum divided by the mass of aluminum in the ACH is 1.5 (i.e., a 50% excess of aluminum). The unreacted aluminum pieces, known as "bones", are set aside and new ingots are stacked in preparation for the next batch. The bones are also used and are set on top of the stack and around the edges. This is a labor intensive procedure that can last a day or longer and is potentially hazardous as workers are in the tank. Plus, given the heavy weight of each ingot, if the ingot stacks were to fall during the setup process, a worker could be seriously injured. This labor intensive method of operation puts the normal batch processing time at 5 days and involves a fair amount of physical labor. Further, the reactor tanks are confined space entry, which means the worker must enter the reactor tank to load the ingots. Confined space entry brings many health and safety concerns, because it raises the risk of worker injury.

Use of Small Form Aluminum Metal (SFAM), defined as pellets smaller than 125 mm and larger than 1 mm, or in some cases, between ¼ to ⅜ inches in diameter, provides large surface area capabilities resulting in shorter batch cycle times as compared to using the conventional aluminum ingots. For example, SFAM pellets with a diameter of ⅜ inch have 28 times more surface area than an equivalent weight of 50 lbs. ingots. Thus, the reaction rate for SFAM pellets is much faster than the rate for the larger ingots. Further, SFAM pellets can be loaded into the reactor tank without a worker performing a confined space entry, decreasing both the batch preparation time and danger to the worker. However, the use of SFAM has proved to be problematic in a number of different ways.

For example, the reaction between the SFAM and the aqueous acid is driven by mass exothermic conditions and progresses until the solution reaches boiling, when copious amounts of hydrogen gas and steam are rapidly released from within a SFAM bed disposed on the bottom of the FRP tank. Since only a small percentage of a total SRAM bed volume is accessible to the acid solution (e.g. void volume), the large volume of gas being generated in the SRAM bed displaces a significant portion of the aqueous acid solution in the SRAM bed. While the weight of the aqueous acid solution constantly pushes the solution down into the bed, the positive gas pressure is enough to generate insufficiently hydrated pockets within the bed, resulting in ACH and other higher aluminum oxides crystallizing out onto the SFAM bed. These crystals effectively clog the bottom of the SFAM bed causing clumps SFAM pellet "bones" to stick together, resulting in a very dense coalesced aluminum "rocks" or "peanut brittle" that is difficult to remove. An example of this byproduct is shown for example, in FIG. 9. During the initial and subsequent ACH runs, some of this clumped solid is dislodged by the bed agitation and gas bubbles, and becomes suspended in the ACH product. This clumped solid is composed of these fine suspended aluminum oxide (e.g., alumina) particles, which do not all readily dissolve to reform ACH. The result is undesirably high turbidity in the ACH product. Thus, there is a need for devices and methods that allow for the use of SFAM pellets without suffering from the traditional problems associated with SFAM pellets. Furthermore, there is a need for devices and methods that allow for continuous batch to batch production of ACH without having to stop production between batches to clean the reactor and add new reactant material.

An additional problem with the conventional method is that in the early stages of the reaction, iron naturally present in aluminum can act as a catalyst, which may be needed to be removed in the later stages. If the iron is not timely removed, a product with increasing turbidity is created. Thus, an efficient and effective method of removing the iron is also needed.

SUMMARY

There is a need to improve the consecutive and repeatable chemical reaction between metals and acids when metal surface area, acid, and other fluids are required to be in consistent contact. Methods and systems described herein can in some instances provide improved consecutive and repeatable chemical reactions. The methods and systems described herein can in some embodiments provide for the use of either active or passive hydration, and optional iron filtering and pellet filtering to create an environment conducive to performing consecutive batch to batch ACH chemical reactions.

A method of producing aluminum chlorohydrate comprises adding small form aluminum metal pellets to a reactant receiving space of a reactor tank to form a pellet bed; adding aqueous hydrochloric acid to the reactant receiving space of the reactor tank; and continuously circulating the aqueous hydrochloric acid through the pellet bed. In some embodiments, continuously circulating aqueous hydrochloric acid dispels reaction gases from the pellet bed.

In some embodiments, methods described herein can further comprise consecutively adding additional small form aluminum metal pellets to the reactant receiving space of the reactor tank as the small form aluminum metal pellets are consumed in the pellet bed.

In some embodiments, methods described herein can further comprise consecutively adding additional aqueous hydrochloric acid to the reactant receiving space of the reactor tank as the aqueous hydrochloric acid is converted into aluminum chlorohydrate.

In some embodiments, a reactor tank comprises a hydration floor positioned proximate to a bottom floor of the reactor tank. In some instances, a hydration floor comprises a pellet bed facing surface; an opposite reactor floor facing surface; and a plurality of fluid passing holes extending through the hydration floor from the pellet bed facing surface and the reactor floor facing surface.

In some instances, a hydration floor described herein can comprise one or more standpipes extending away from the pellet bed facing surface, the standpipes being in fluid communication with the reactant receiving space of the reactor tank on the pellet bed facing surface side of the hydration floor and the reactant receiving space of the reactor tank on the reactor floor facing surface side of the hydration floor. In some cases, aqueous hydrochloric acid is continuously circulated through the one or more standpipes from the reactant receiving space on the pellet bed facing surface side of the hydration floor to the reactant receiving space on the reactor floor facing surface side of the hydration floor. In some instances, aqueous hydrochloric acid is continuously circulated through the one or more standpipes using gravity.

In some embodiments, a pellet bed described herein is positioned on the pellet bed facing surface of the hydration floor, and the aqueous hydrochloric acid continuously circulates from the reactant receiving space on the reactor floor facing surface side of the hydration plate through the plurality of fluid passing holes into the pellet bed.

In some embodiments, a hydration floor described herein comprises a plurality of hydration plates. Each hydration plate can in some cases have a shape complimentary to each of the other hydration plates, and the plurality of hydration plates are connectable to form the hydration floor. Moreover, in some instances, one or more of the plurality of hydration plates comprises one or more standpipes.

In some embodiments, aqueous hydrochloric acid is continuously circulated through the pellet bed by pumping aqueous hydrochloric acid from a reactant receiving space of the reactor tank on the pellet bed facing surface side of the hydration floor to the reactant receiving space on the reactor floor facing surface side of the hydration floor. In some instances, the pellet bed is positioned on the pellet bed facing surface of the hydration floor, and the aqueous hydrochloric acid continuously circulates from the reactant receiving space on the reactor floor facing surface side of the hydration plate through the plurality of fluid passing holes into the pellet bed.

In some embodiments, a reactor tank described herein comprises a plurality of fluid dispersing pipes positioned proximate to a bottom floor of the reactor tank. The plurality of fluid dispersing pipes in some instances are positioned in the pellet bed. Aqueous hydrochloric acid in some instances is continuously circulated through the pellet bed by being pumped into the pellet bed through the plurality of fluid dispersing pipes. In some cases, the plurality of fluid dispersing pipes are fluidly connected to a manifold, and the manifold is fluidly connected to a pump.

In some embodiments, a reactor tank described herein comprises a one or more standpipes connected to a bottom floor of the reactor tank. Each standpipe can comprise a plurality of fluid dispersing holes positioned along a length of the standpipe. In some cases, the one or more standpipes extend from the bottom surface of the reactor tank, through the pellet bed, and out of the pellet bed. In some embodiments, an end of the standpipes positioned outside of the pellet bed is in fluid communication with the reactant receiving space of the reactor tank above the pellet bed. Aqueous hydrochloric acid can in some cases be continuously circulated through the one or more standpipes from the reactant receiving space above the pellet bed into the pellet bed through the fluid dispersing holes of the one or more standpipes. In some embodiments, aqueous hydrochloric acid is continuously circulated through the one or more standpipes using gravity.

BRIEF DESCRIPTION OF THE DRAWINGS

The invention will now be described by way of example, with reference to the following drawings, of which.

DETAILED DESCRIPTION

Figure 1:
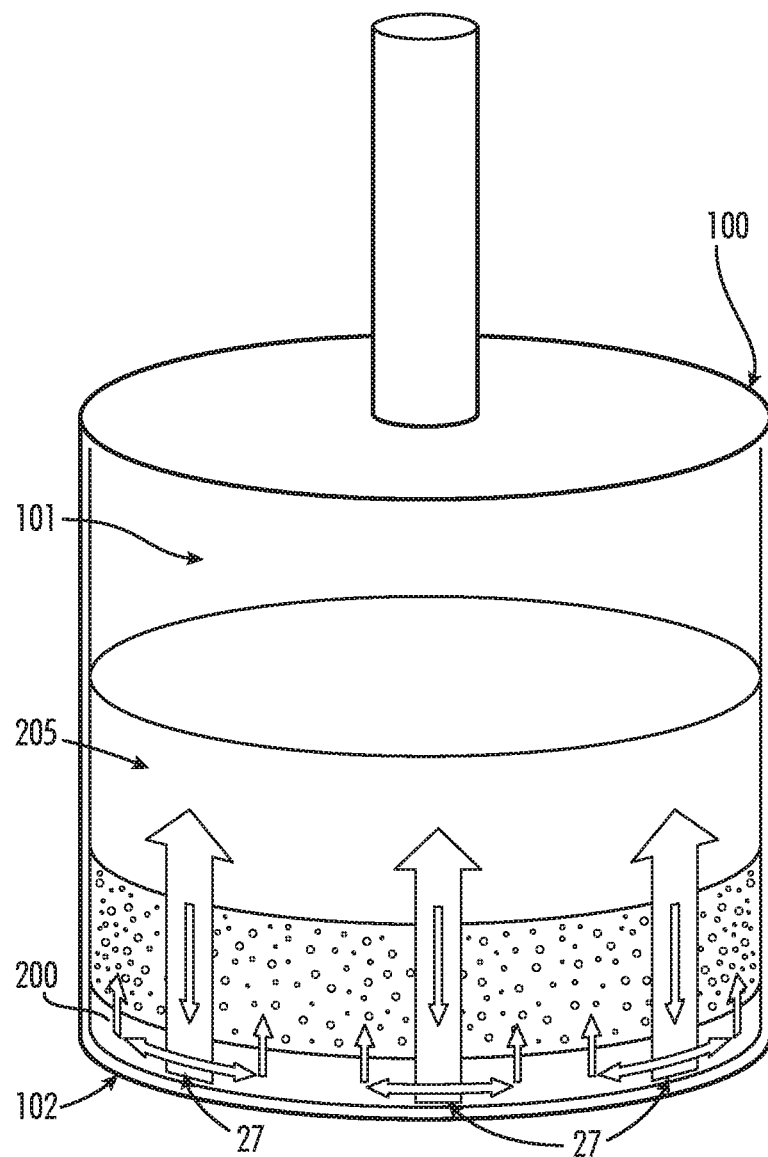
FIG. 1 is a perspective view of a reaction vessel with a modular hydration floor, showing fluid movement.

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The term "magnetic particle" refers to materials have magnetic properties. Typically these particles are iron-based, although other magnetic materials are also envisioned.

1. Hydration Plate

In an aspect, a hydration plate is described herein. For example, as shown in FIGS. 2A-2H, the hydration plate 10 comprises a body 20 having a reactant facing surface 21a, and an opposite floor facing surface 21b. A plurality of fluid passing holes 22 are positioned in the reactant facing surface 21a. A fluid receiving space 30 is positioned in the body 20, and is in fluid communication with the plurality of fluid passing holes 22. One or more fluid transfer openings 23 are positioned along a side of the body 20, between the reactant facing surface 21a and the floor facing surface 21b. The fluid transfer openings 23 are in fluid communication with the fluid receiving space 30. The plurality of fluid passing holes 22 are operatively connected to the fluid receiving space 30, being in fluid communication with the fluid receiving space 30. A standpipe receiving hole 24 is positioned in the reactant facing surface 21a, the standpipe receiving hole 24 being in fluid communication with the fluid receiving space 30.

Figure 2A:
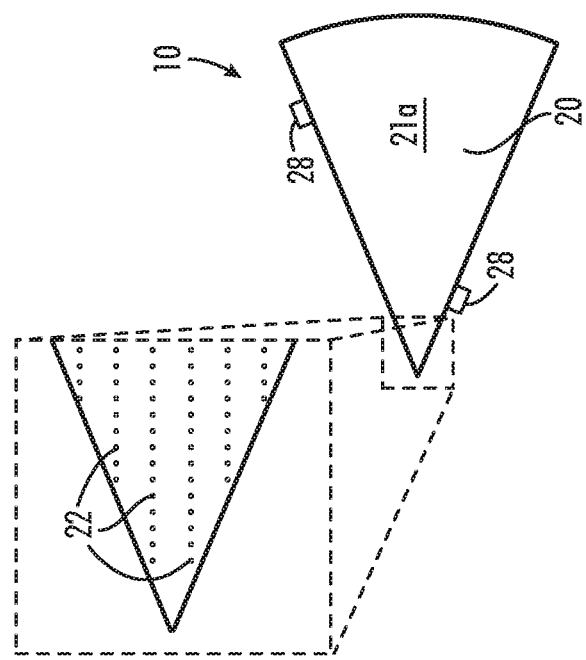
FIG. 2A is a plan view of the modular hydration floor of FIG. 1 having a plurality of hydration plates with a plurality of attachment mechanisms.
Figure 2A:
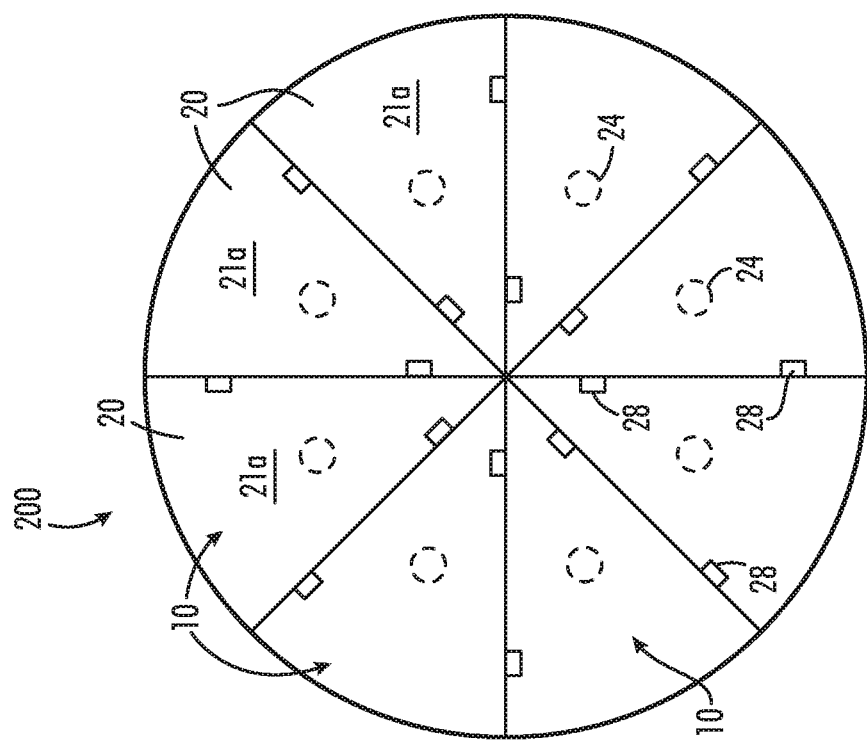
Figure 2B:
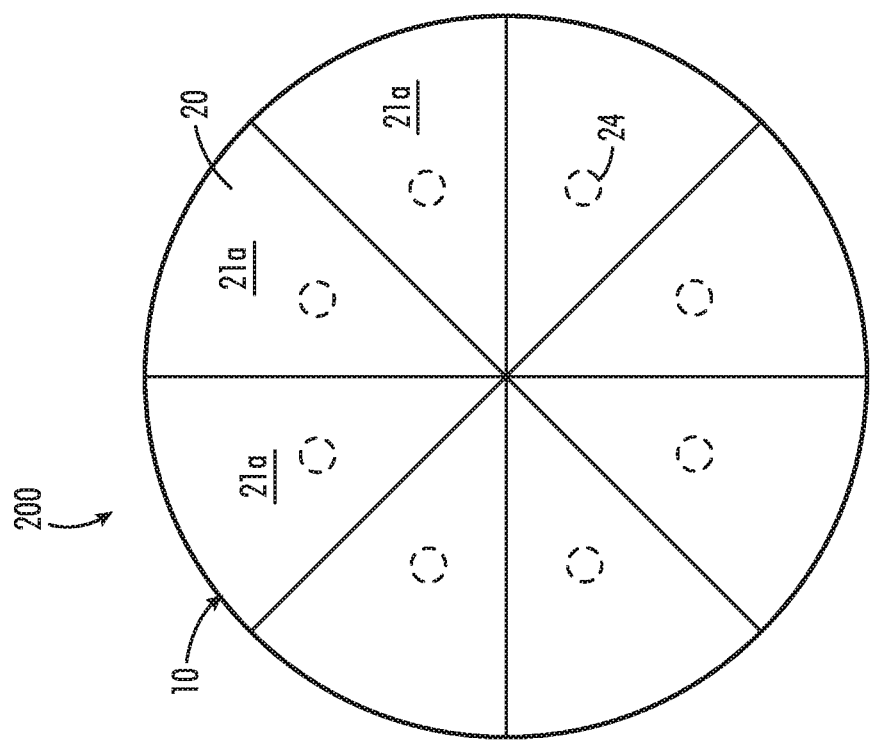
FIG. 2B is a plan view of the modular hydration floor of FIG. 1 having a plurality of hydration plates without the plurality of attachment mechanisms.
Figure 2B:
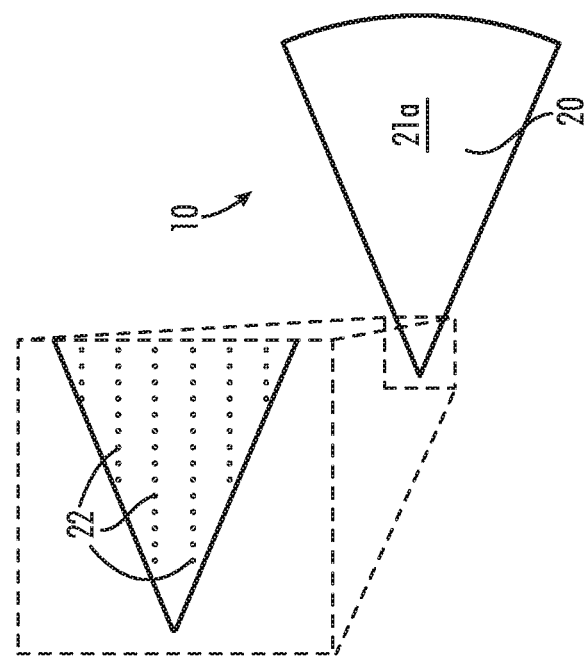
Figure 2C:
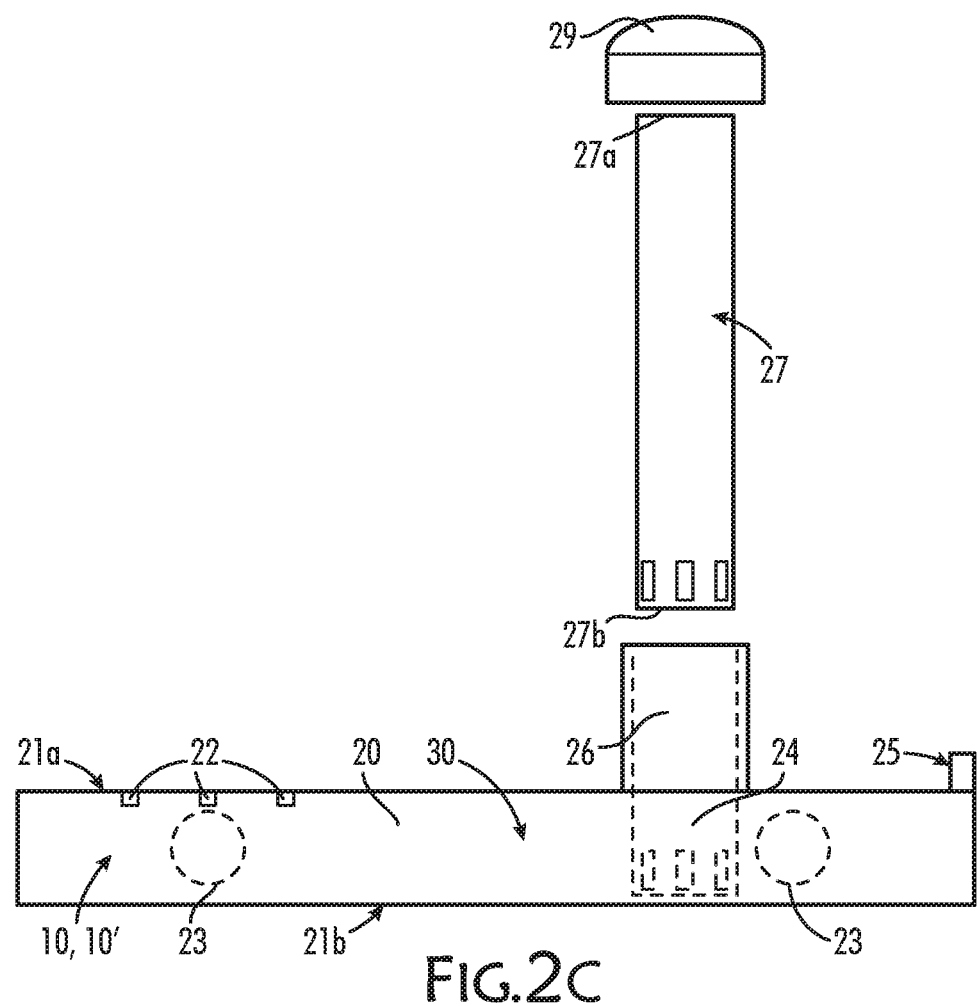
FIG. 2C is a side view of a first standpipe assembly.

In an embodiment shown in FIG. 2C, the hydration plate 10 has one or more optional connection tabs 25 positioned on the reactant facing surface, each connection tab 25 being removably connectable to a lifting mechanism (not shown). The connection tab 25 can be connected to the lifting mechanism during installation of the hydration plate 10 into a reactor vessel. The lifting mechanism can be a rope or cable, or other lifting mechanisms known in the art. In the embodiment shown in FIG. 2D, the hydration plate 10 does not have one or more connections tabs 25.

Figure 2D:
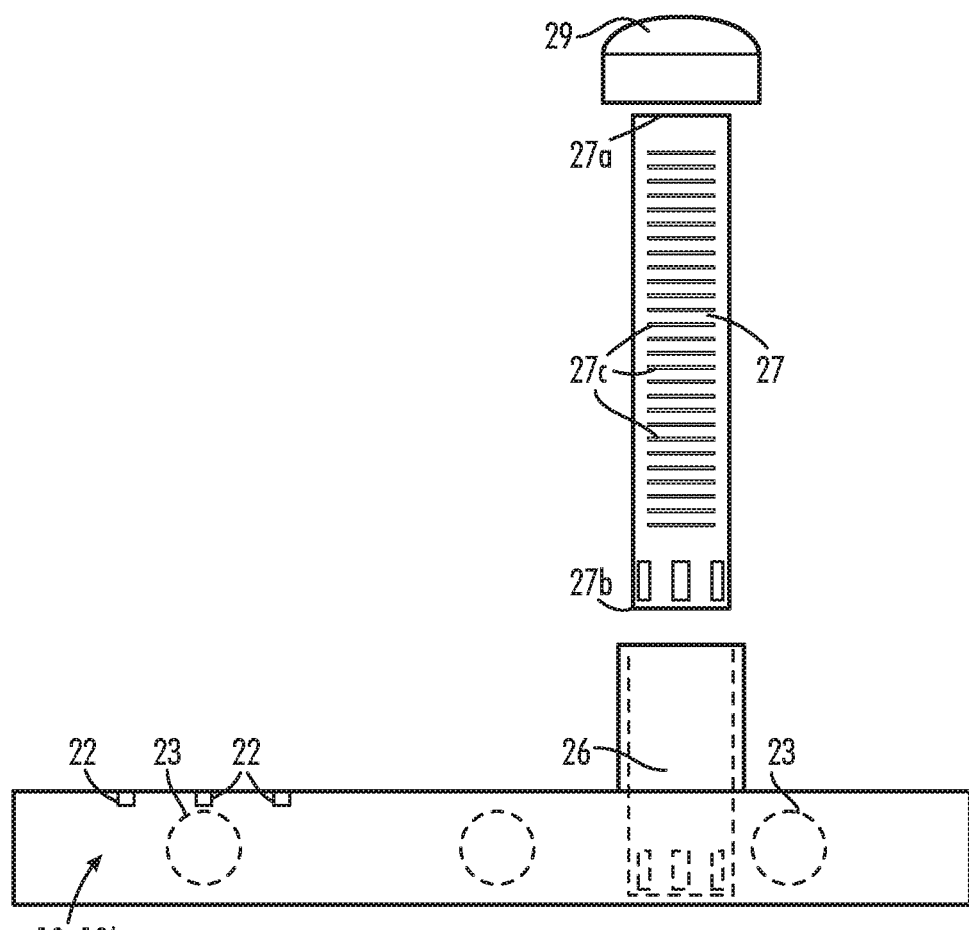
FIG. 2D is a side view of a second standpipe assembly.

As shown in the embodiments of FIGS. 2C and 2D, the hydration plate 10 can have a standpipe connecting sleeve 26 positioned in the standpipe receiving hole 24, the standpipe connecting sleeve 26 having a shape complementary to a fluid exiting end 27a of a standpipe 27. The standpipe connecting sleeve 26 can be removably positioned in the standpipe receiving hole 24. In other embodiments, the standpipe connecting sleeve 26 is permanently positioned in the standpipe receiving hole 24. In some embodiments, the hydration plate 10 lacks the standpipe connecting sleeve 26, and instead only has the standpipe receiving hole 24, which has a shape complementary to the fluid exiting end 27a of the standpipe 27.

As shown in the embodiment of FIG. 2A, each hydration plate 10 can have a complementary shape to each of the other hydration plates 10. Optionally, each hydration plate 10 can have one or more attachment mechanisms 28, such as a tab, to align and connect a plurality of hydration plates 10 together. However, in other embodiments, such as that shown in FIG. 2B, each hydration plate 10 lacks the attachment mechanism 28.

Each hydration plate 10 can be shaped in any shape, such as pie-shaped, square, rectangle, hexagonal, or any other shape. The shape of the hydration plate 10 will be such that when connected to other hydration plates 10, the connected plurality of hydration plates 10 will form a shape complementary to shape of a reactant receiving space 101 and a bottom floor 102 of a reactor tank 100.

The hydration plate 10 can be made from any material that is inert to the reagents and conditions used in the reaction. Materials include, but are not limited to, stainless steel, copper, plastics, composites, fiberglass, or other materials not inconsistent with the objectives of this disclosure.

2. Modular Hydration Floor

In another aspect, a modular hydration floor 200 comprises a plurality of hydration plates 10 described in Section I. In an embodiment shown for example in FIGS. 1, 2C, and 2D, standpipe 27 is positioned in standpipe receiving hole 24 or the standpipe connecting sleeve 26 of the hydration plates 10. The standpipe 27 comprises a first end 27a and the opposite fluid exiting end 27b. A solids excluding cap 29 is positioned on first end 27a of the standpipe 27. The solids excluding cap 29 can be a cup-shaped "cap" such as the embodiment illustrated in FIG. 2C that completely covers the first end 27a and blocks entry of any fluid or materials into the first end 27a. In other embodiments, the solids excluding cap 29 can be "T"-shaped, an elbow-shape, or mesh cap that excludes or prevents solid reactants from entering the standpipe 27 while allowing fluid reactants to enter unrestricted. In an embodiment shown in FIG. 2D, the standpipe 27 comprises a plurality of fluid entry openings 27c positioned between the first end 27a and the fluid exiting end 27b. The number, size, shape, and positional location of the fluid entry openings 27c can vary based on the conditions and materials of the reaction. For example, the fluid entry openings 27c can be round or oval holes, or slits.

In an embodiment, when two or more hydration plates 10 are connected, each of the fluid transfer opening 23 of the connected hydration plates 10 are in fluid communication with adjacently connected plates. Thus, fluid passing through the standpipe 27 from the reactant receiving space 101 of the reactor tank 100 is circulated through the hydration floor 200 via the fluid transfer openings 23.

Each standpipe 27 is in fluid communication with the plurality of fluid passing holes 22 through the fluid receiving space 30.

When the modular hydration floor 200 is positioned on the bottom floor 102 of the reactor tank 100, the modular hydration floor 200 forms a false floor in the reactor tank 100 with the fluid receiving space 30 being positioned between the hydration floor 200 and the bottom floor 102 of the reactor tank 100.

3. Monolithic Hydration Floor

In another aspect shown in FIGS. 2E-2H, a monolithic hydration floor 200' can comprise a single hydration plate 10' rather than comprising a plurality of hydration plates 10 as described in Section II for the modular hydration floor 200. The hydration plate 10' has a reactant facing surface 21a, and an opposite floor facing surface 21b. A plurality of fluid passing holes 22 are positioned in the reactant facing surface 21a and pass through the hydration plate 10' to the reactant facing surface 21a.

Figure 2E:
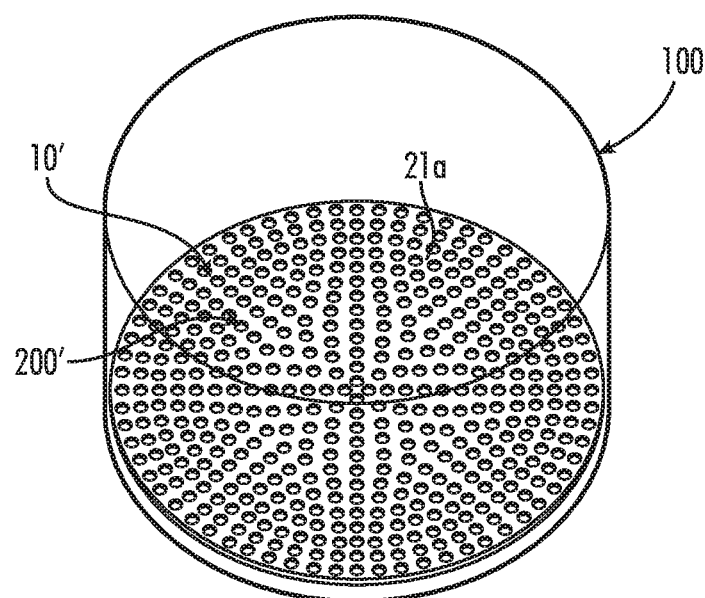
FIG. 2E is a perspective view of a monolithic hydration floor positioned in a reactor tank.
Figure 2F:
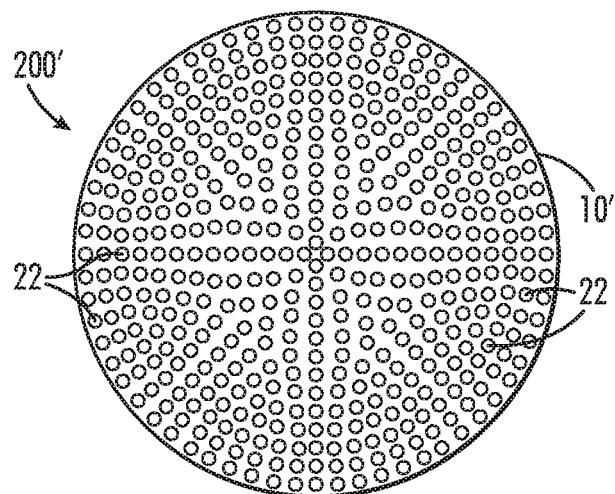
FIG. 2F is a plan view of the monolithic hydration floor of FIG. 2E.
Figure 2G:
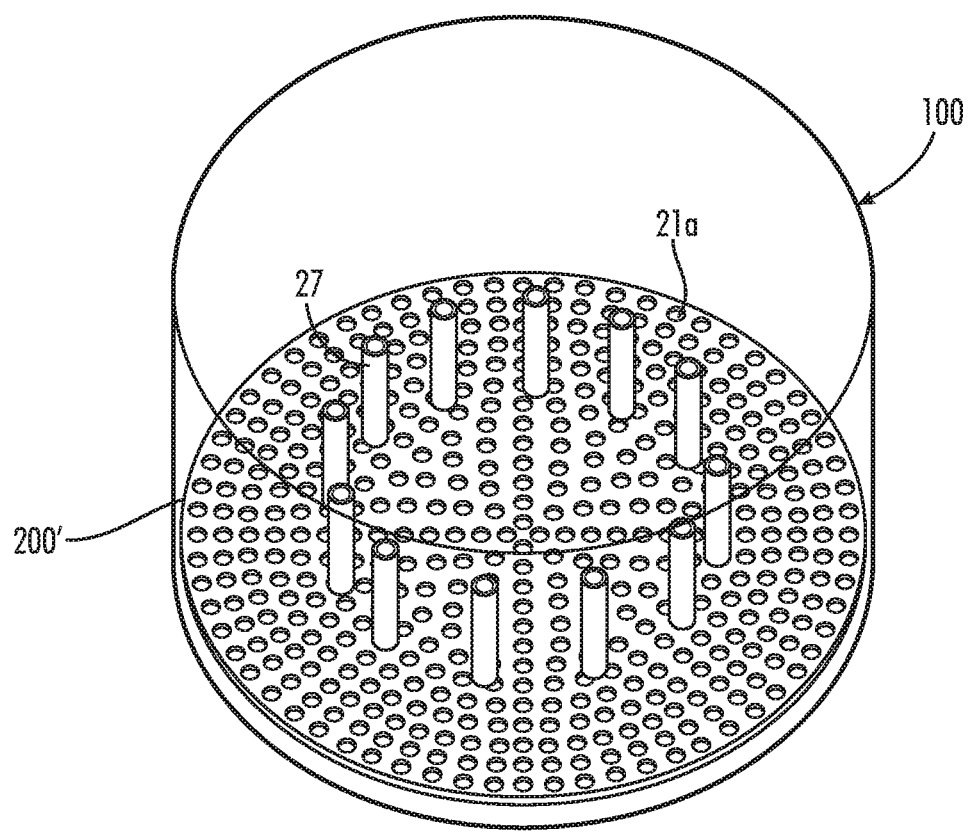
FIG. 2G is a perspective view of a monolithic hydration floor with standpipes positioned in a reactor tank.
Figure 2H:
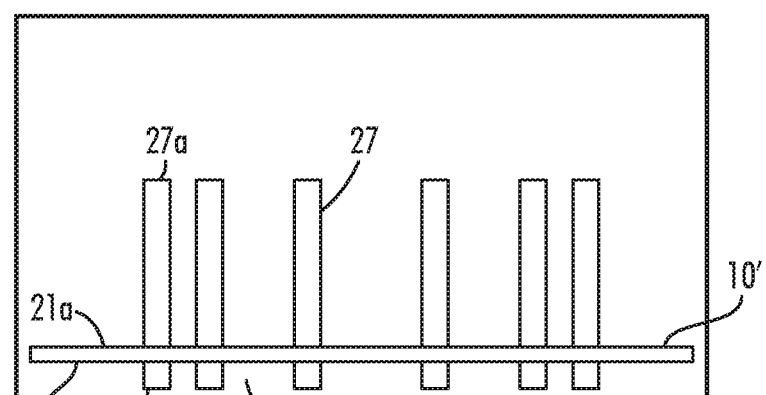
FIG. 2H is a side view of the monolithic hydration floor of FIG. 2G.

As shown in the embodiments of FIGS. 2C, 2D, 2G, and 2F, the hydration plate 10' can have one or more standpipe receiving holes 24 positioned in the reactant facing surface 21a, the standpipe receiving holes 24 being in fluid communication with a fluid receiving space 30' formed between the reactant facing surface 21a of the hydration plate 10' and a reactor tank 100 (see FIG. 2H). However, as shown in the embodiments of FIGS. 2E and 2F, the hydration plate 10' can have a plurality of fluid passing holes 22 without having a standpipe receiving hole 24.

In the embodiments of FIGS. 2C, 2D, 2G, and 2F, the hydration plate 10' can have a standpipe connecting sleeve 26 positioned in the standpipe receiving hole 24, the standpipe connecting sleeve 26 having a shape complementary to a fluid exiting end 27b of a standpipe 27. The standpipe connecting sleeve 26 can be removably positioned in the standpipe receiving hole 24. In other embodiments, the standpipe connecting sleeve 26 is permanently positioned in the standpipe receiving hole 24. In some embodiments, the hydration plate 10' lacks the standpipe connecting sleeve 26, and instead only has the standpipe receiving hole 24, which has a shape complementary to the fluid exiting end 27a of the standpipe 27, the fluid exiting end 27a being positionable in the standpipe receiving hole 24. The standpipe 27 can be of the same or similar structure previously described above with respect to FIGS. 2C and 2D.

The hydration plate 10' can be made from any material that is inert to the reagents and conditions used in the reaction. Materials include, but are not limited to, stainless steel, copper, plastics, composites, fiberglass, or other materials not inconsistent with the objectives of this disclosure.

4. Reactor System with a Hydration Floor

In another aspect, a reactor system comprises a reactor tank 100 having a reactant receiving space 101 with a bottom floor 102. A hydration floor 200 or hydration floor 200' described in Section II and Section III, respectively, can be positioned in the reactant receiving space 101 proximate to the bottom floor 102. When the hydration floor 200, 200' is positioned in the reactant receiving space 101, the hydration floor 200, 200' forms a false floor positioned over the bottom floor 102 forming the fluid receiving space 30 between the hydration floor 200, 200' and the bottom floor 102 of the reactor tank 100.

In practice for the reactor system comprising embodiments described in FIGS. 1, 2A-2D, 2G, and 2H, using hydration floor 200 or hydration floor 200', both having a plurality of standpipes 27, when a fluid 205 is placed in the reactant receiving space 101 of the reactor tank 100, passive fluid dynamics move the fluid 205 through the standpipe 27 into the fluid receiving space 30, through the fluid receiving space 30 into the fluid passing holes 22 of the hydration floor 200 or hydration floor 200', through the fluid passing holes 22 into the reactant bed, and ultimately returning back into the reactant receiving space 101 (see FIG. 1). Thus, the fluid 205 can continuously replenish the fluid 205 that is drawn up through the bottom of the reactor tank 100 by passing through the standpipes 27. As the fluid 205 passes through the reactant bed, heat and/or gases are dispelled from the reactant bed. One advantage of this approach is that the reactor system can operate continuously in a passive manner without the need for pumps, make the reactor system energy efficient.

In some embodiments, reactor systems comprising hydration floor 200 or hydration floor 200' having a plurality of standpipes 27 is used to produce ACH using SFAM rather than the traditionally used large aluminum ingots. SFAM can added to the reactant receiving space 101 of reactor 100 to form a reactant bed reactant facing surface 21a of hydration floor 200 or hydration floor 200'. A plurality of standpipes 27 are positioned in the SFAM reactant bed. In some instances, the standpipes 27 are positioned vertically in the SFAM reactant bed, where a bottom end portion of the standpipes 27 are buried in the SFAM reactant bed and a portion of first ends 27a extend out of the top of the SFAM reactant bed. Aqueous hydrochloric acid reaction fluid 205 can be added into the reactant receiving space 101 and can fill the reactant receiving space 101 to a level above the first ends 27a of the standpipes 27. The aqueous hydrochloric acid reaction fluid 205 can then enter the first ends 27a of the standpipes 27, be pulled into the standpipes 27 using gravity, deposited into the fluid receiving space 30, and ultimately be dispersed out of the fluid passing holes 22 in hydration floor 200 or 200' directly into the SFAM reactant bed, as indicated by the arrows in FIG. 1.

In practice for the embodiment described in FIGS. 2E and 2F in a reactor system uses hydration floor 200' without any standpipes 27, one or more pumps (not shown) can be used to pull reactant fluid 205 from reactant receiving space 101 above the hydration floor 200' and reactant bed, and release it below the hydration floor 200' into the fluid receiving space 30. This active release into the fluid receiving space 30 through pumping forces the fluid 205 up through the fluid passing holes 22 of hydration floor 200' into the reactant bed, and ultimately back into the reactant receiving space 101. Thus, when the reactant bed is positioned on the reactant facing surface 21a, the fluid 205 will be forced to pass through the reactant bed, dispelling any heat and/or gases from the reactant bed. An advantage of this approach is that hydration floor 200' is relatively simple and inexpensive compared to hydration floors 200 and 200' having a plurality of standpipes 27.

An advantage of the reactor systems described in this Section is that chemical reactions between metals and acids can be improved for reactions where the metal surface area, acid, and other fluids are required to be in consistent contact. For example, in an ACH reaction where hydrogen gas is produced in large quantities, hydrochloric acid and other fluid reagents can be directly dispersed into the SFAM reactant bed, expelling hydrogen gas and solvating the SFAM reactant bed. Gaseous hydrogen voids can thus be minimized or eliminated, since the flow of the hydrochloric acid and other fluid reagents through the pellet bed will dispel the hydrogen gas out of the bed.

Another advantage of reactor systems described in this Section is that these systems allow for continuous batch to batch processing of specialty chemical reactions that require adequate hydration to complete successfully.

Yet another advantage of reactant systems described in this Section is that since SFAM pellets can be used rather than aluminum ingots in the production of ACH, continuous batch to batch processing of ACH can be performed. For example, since the SFAM pellet bed remains hydrated throughout the reaction, the SFAM pellets are consumed to completion, so cleaning of the reactor tank is unnecessary between batches. Instead, fresh SFAM pellets and hydrochloric acid can be continually added to allow continuous batch to batch processing of ACH.

An advantage of reactant systems described in this Section using hydration floor 200 is that because hydration floor 200 is made of multiple hydration plates, the hydration floor can be added or removed from the reactor tank as needed.

5. Reactor System with Plurality of Fluid Dispersing Pipes

Figure 10:
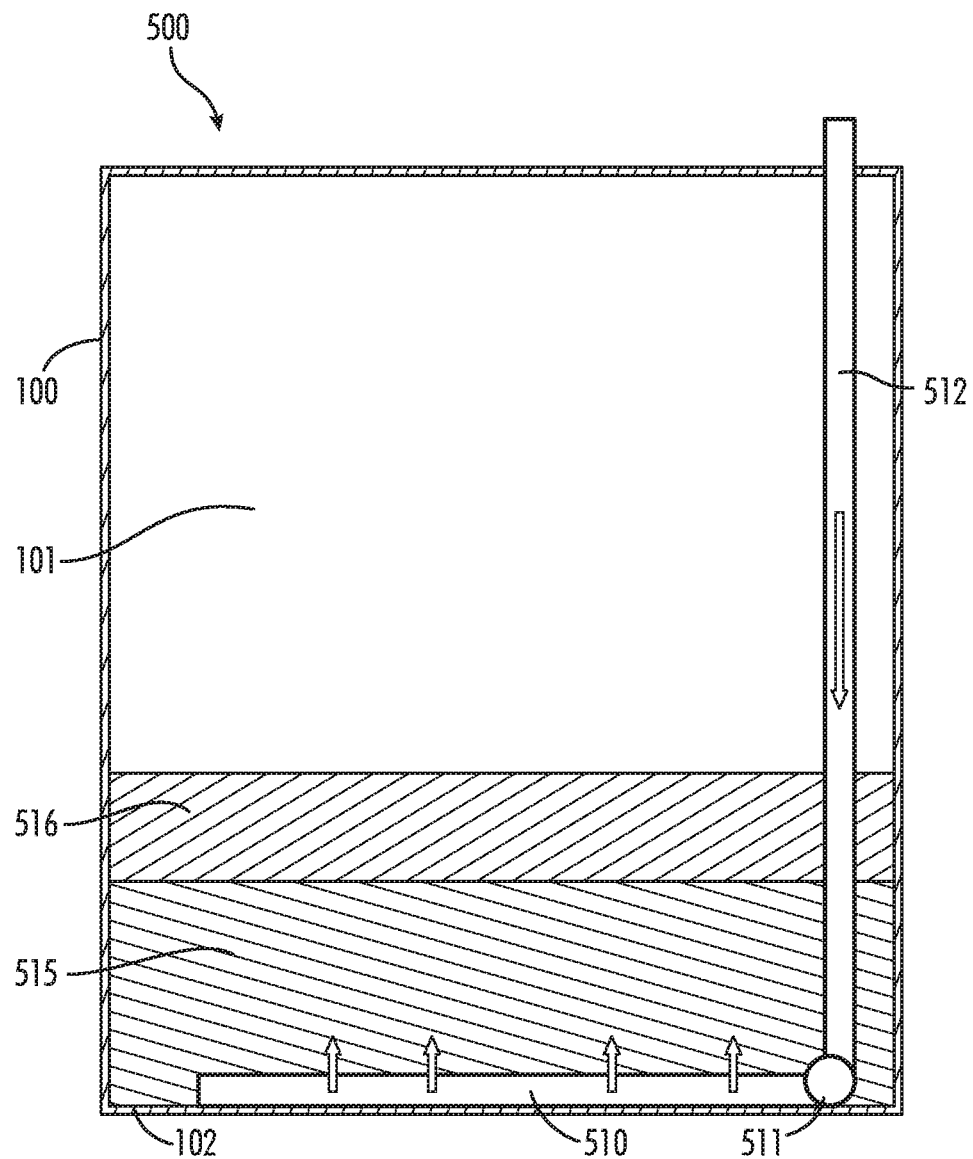
FIG. 10 is a cross-sectional side view of a reactor system with a manifold and plurality of fluid dispersing pipes.
Figure 11:
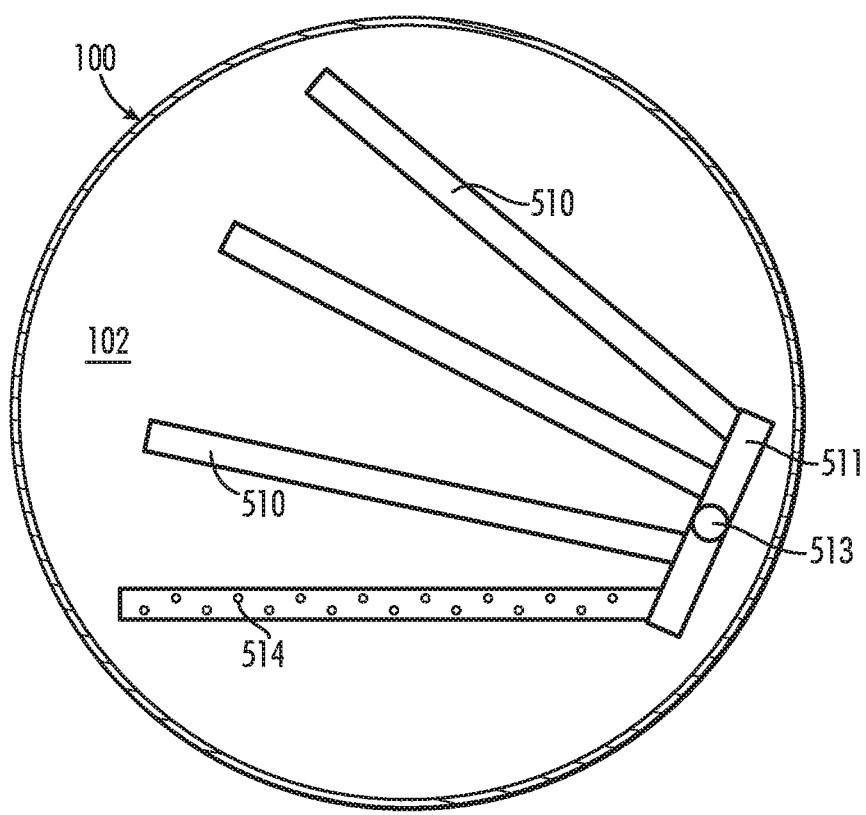
FIG. 11 is a top view of the plurality of fluid dispersing pipes of FIG. 10 connected to a manifold.

In another aspect, as illustrated in FIGS. 10 and 11, a reactor system 500 comprises a reactor tank 100 having a reactant receiving space 101 with a bottom floor 102, and one, two, three or a plurality of fluid dispersing pipes 510 are positioned proximate to the bottom floor 102. Fluid dispersing pipes 510 extend horizontally, approximately parallel with the bottom floor 102. In some embodiments, each fluid dispersing pipe 510 is perforated, having a plurality of fluid dispersing holes 514. The fluid dispersing holes 514 can have a diameter that is large enough to pass a fluid, but small enough to prevent entry of small reactant pellets.

In some instances, fluid dispersing pipes 510 connect to a single or common manifold 511, and the manifold 511 is connected to a fluid supplying pipe 512. However, in other cases, a first portion of the fluid dispersing pipes 510 can be connected to a first manifold, and the other second portion of the fluid dispersing pipes 510 can be connected to a second manifold, and each manifold connected to a different fluid supplying pipe. The first portion of fluid dispersing pipes 510 can be interdispersed with the second portion of fluid dispersing pipes 510 in some embodiments. However, in other embodiments, the first portion of fluid dispersing pipes 510 can be positioned in a first zone in the reactor tank 100, and the second portion of fluid dispersing pipes 510 can be positioned in a different second zone in the reactor tank 100. In further embodiments, n portions of fluid dispersing pipes 510 can be used to create n zones, where n can be any integer, such as 2, 3, 4, 5, 6, 7, 8, 9, 10 or more. In this multiple zone configuration, each zone can be independently controlled by supplying or not supplying fluid to the fluid dispersing pipes 510 in each zone.

As shown in FIG. 10, fluid supplying pipe 512 can extend vertically away from the bottom floor 102, however, in some embodiments, the fluid supplying pipe 512 can extend horizontally and exit a side wall of the reactor tank 100 or even the bottom floor 102 and be operatively connected to a pump. Each fluid dispersing pipe 510 can be connected to manifold 511 through any mechanism not inconsistent with the objectives of this disclosure. For example, in some instances, each fluid dispersing pipe 510 can be inserted into a complimentary shaped dispersing pipe receiving space (not shown) on manifold 511. Fluid supplying pipe 512 can connect to manifold 511 in a similar manner, such as being inserted into a complimentary shaped supplying pipe receiving space 513. However, this is mechanism is exemplary, and in other instances the fluid supplying pipe 512 can be connected to manifold 511 using any mechanism not inconsistent with the objectives of this disclosure, such as a screw fitting.

In some embodiments, fluid dispersing pipes 510 are positioned on the bottom floor 102. In other embodiments, the reactor system 500 further comprises a modular hydration floor as described in Section II or a monolithic hydration floor as described in Section III. In these instances, the fluid dispersing pipes 510 can be positioned on a reactant facing surface of the hydration floor, or in a space between the bottom floor 102 of the reactor 100 and the hydration floor.

The fluid supplying pipe 512 can operatively be connected to a pump, and can transfer fluid directly to the bottom of the reactor tank 100 through the fluid dispersing pipes 510.

For reactor system 500, fluid dispersing pipes 510 can be positioned in reactant bed 515. In some instances, the fluid dispersing pipes 510 are positioned at a bottom of the reactant bed 515, and in other cases, are centrally positioned in the reactant bed 515. Fluid reactants 516 can be pumped through the fluid supplying pipe 512 into the fluid dispersing pipes 510, and dispersed out of the fluid dispersing holes 514 directly into the reactant bed 515, as indicated by the arrows in FIG. 10.

In some embodiments, reactor system 500 is used to produce ACH using SFAM rather than the traditionally used large aluminum ingots. SFAM can added to the reactant receiving space 101 of reactor 100 to form reactant bed 515. A plurality of fluid dispersing pipes 510 are positioned in the SFAM reactant bed 515. In some instances, the fluid dispersing pipes 510 are positioned horizontally in the SFAM reactant bed 515, and are buried therein. Aqueous hydrochloric acid reaction fluid 516 can be added into the reactant receiving space 101 and can fill the reactant receiving space 101 to a level above the top of the SFAM reactant bed 515. The aqueous hydrochloric acid reaction fluid 516 can then be pumped through the fluid supply pipe 512 to the fluid dispersing pipes 510, and dispersed out of the fluid dispersing holes 514 directly into the SFAM reactant bed 515, as indicated by the arrows in FIG. 10.

An advantage of the reactor system 500 is that chemical reactions between metals and acids can be improved for reactions where the metal surface area, acid, and other fluids are required to be in consistent contact. For example, in an ACH reaction, where hydrogen gas is produced in large quantities, the hydrochloric acid and other fluid reagents can be directly dispersed into the SFAM reactant bed, expelling hydrogen gas and solvating the SFAM reactant bed. Gaseous hydrogen voids can thus be minimized or eliminated, since the flow of the hydrochloric acid and other fluid reagents through the pellet bed will dispel the hydrogen gas out of the bed.

Another advantage of reactant system 500 is that since SFAM pellets can be used rather than aluminum ingots in the production of ACH, continuous batch to batch processing of ACH can be performed. For example, since the SFAM pellet bed remains hydrated throughout the reaction, the SFAM pellets are consumed to completion, so cleaning of the reactor tank is unnecessary between batches. Instead, fresh SFAM pellets and hydrochloric acid can be continually added to allow continuous batch to batch processing of ACH.

Another advantage of reactor system 500 is that the flow rate, timing, and location of reactant fluid delivery into the reactant bed can be precisely controlled.

Another advantage of reactor system 500 is that in embodiments using multiple manifolds 511 to create different zones allows reactant fluid, the flow rate and timing of reactant fluid delivery in each zone can be independently controlled. Therefore in instances where a pellet bed is reacting unevenly, the flow rate of the reactant fluid can be increased or decreased, or even turned off. For example, in an ACH reaction, one side of a SFAM pellet bed is frequently observed to react slower than the other side of the SFAM pellet bed. Thus, in this embodiment, the flow rate of hydrochloric acid can be increased for the slower reacting side of the pellet bed to speed up the reaction.

6. Reactor System with Standpipes

Figure 12:
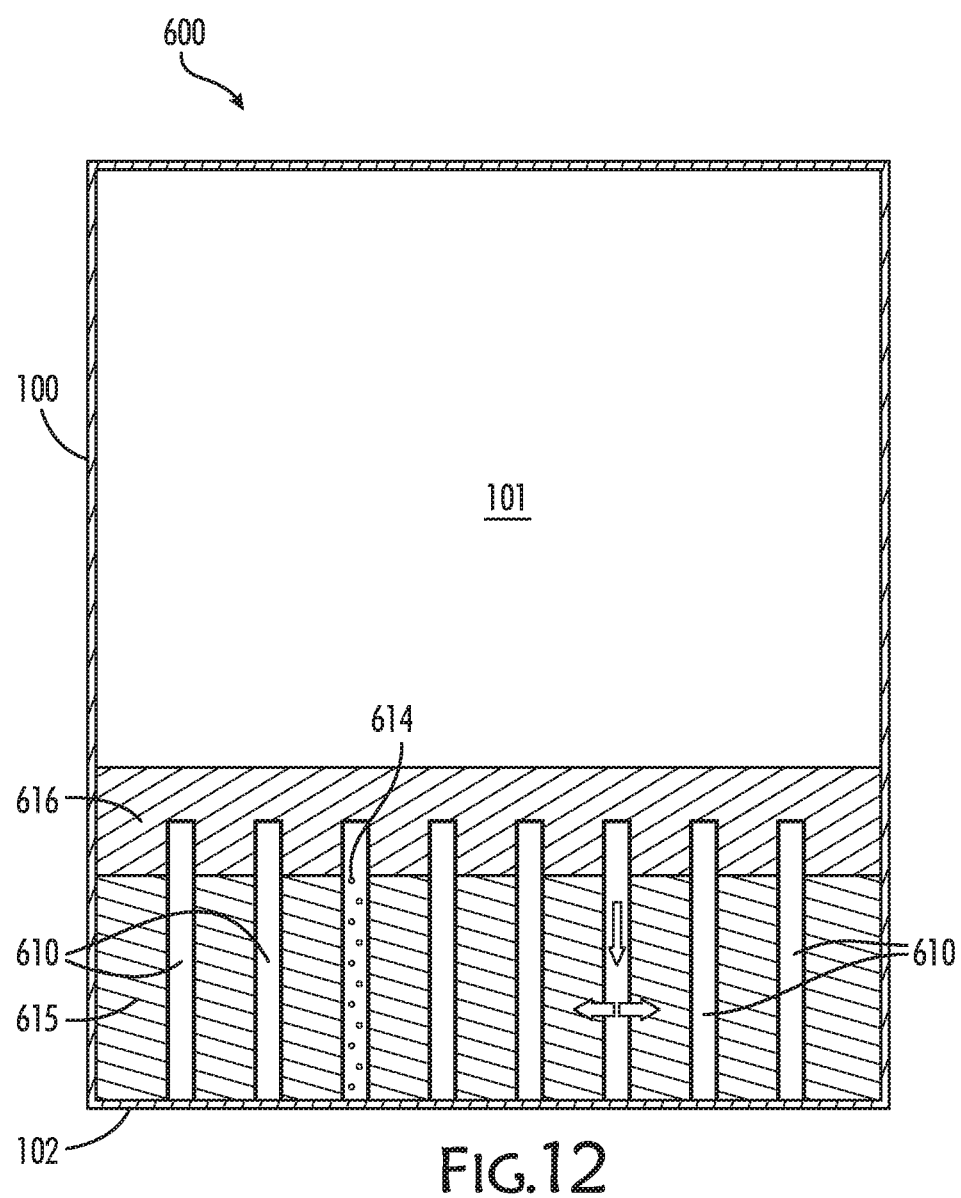
FIG. 12 is a cross-sectional side view of a reactor system having a plurality of standpipes connected to a bottom floor of a reactor tank.
Figure 13:
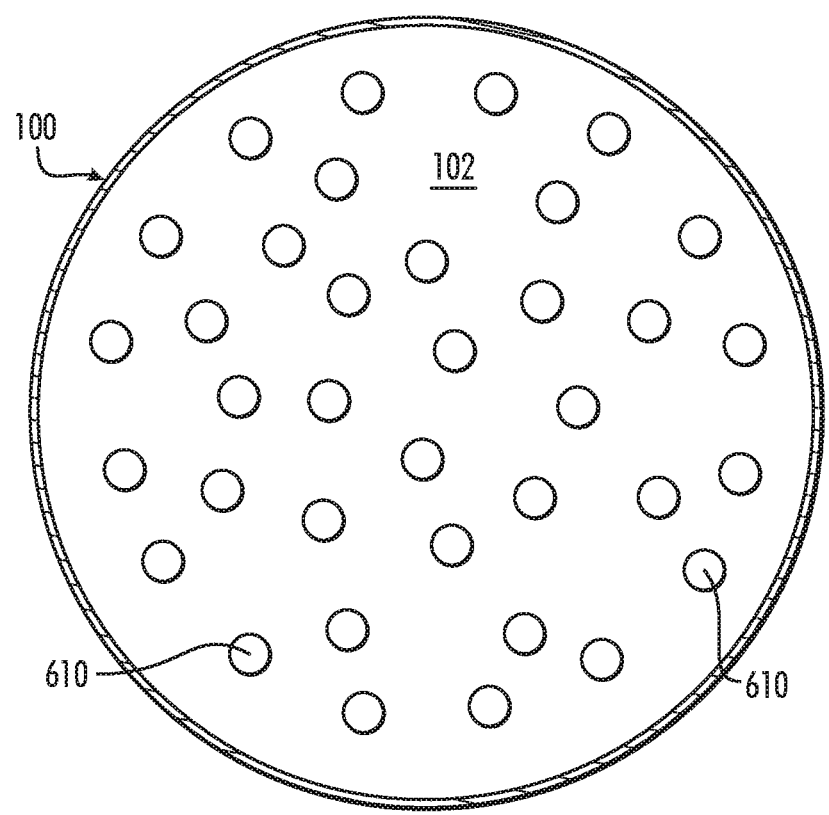
FIG. 13 is a top view of the plurality of standpipes of FIG. 12 connected to a bottom floor of a reactor tank.

In another aspect, as illustrated in FIGS. 12 and 13, a reactor system 600 comprises a reactor tank 100 having a reactant receiving space 101 with a bottom floor 102, and a plurality of standpipes 610 connected to the bottom floor 102. As shown, each standpipe 610 rises vertically from the bottom floor 102, and extends to a height that is above a height of a pellet bed 615 in the reactant receiving space 101.

In this embodiment, the standpipes 610 are connected to the bottom floor 102 in the absence of a hydration or raised floor previously described herein. Each standpipe 610 can be connected directly to the bottom floor 102 in any manner not inconsistent with the objectives of this disclosure. For example, each standpipe 610 can be connected to the bottom floor 102 using one or more fasteners; a bottom end of each of the plurality of standpipes 610 can be inserted into one of a plurality of standpipe receiving holes disposed on the bottom floor 102, the bottom end being analogous to the second end 27b of standpipe 27 in FIG. 2C; a false floor can be directly placed on the bottom floor 102 and each standpipe 610 can be fastened to this false floor; this false floor can have a plurality of standpipe receiving holes into which the plurality of standpipes can be inserted; or each of the standpipes can be interconnected at a bottom end with a grid-like series of horizontally extending pipes. In some embodiments, a bottom end of each standpipe 610 can optionally have a flange, through which a fastener can be inserted to secure the bottom end of the standpipe 610 to the bottom floor 102 or false floor. In some instances, each standpipe 610 can have a cap on an opposite top end, such as the solids excluding cap 29 shown in FIG. 2C positioned on the first end 27a of standpipe 27.

Each standpipe 610 can be perforated, having a plurality of fluid dispersing holes 614 positioned along a length of the standpipe 610. The fluid dispersing holes 614 can have a diameter that is large enough to pass a fluid, but small enough to prevent entry of small reactant pellets. In some embodiments, the plurality of fluid dispersing holes 614 are restricted to areas of the standpipe 610 that will directly contact pellets in a reactant bed, such as reactant bed 615. Each standpipe 610 can be covered in reactant fluids 616.

For reactor system 600, fluid reactants 616 can enter the top end of each standpipe 610, pass through the center of the standpipe 610 towards the bottom end 102 of the reactor tank 100 using gravity, and exit the standpipe 610 through the fluid dispersing holes 614, as illustrated by the arrows in FIG. 12. Since the fluid dispersing holes 614 are positioned in areas of the standpipe 610 that are in contact with the reactant bed 615, the fluid reactants 616 are delivered directly into the reactant bed 615.

In some embodiments, reactor system 600 is used to produce ACH using SFAM rather than the traditionally used large aluminum ingots. SFAM can added to the reactant receiving space 101 of reactor 100 to form reactant bed 615. A plurality of standpipes 610 are positioned in the SFAM reactant bed 615. In some instances, the standpipes 610 are positioned vertically in the SFAM reactant bed 615, where a bottom end portion of the standpipes 610 are buried in the SFAM reactant bed 615 and a top end portion extends out of the top of the SFAM reactant bed 615. Aqueous hydrochloric acid reaction fluid 616 can be added into the reactant receiving space 101 and can fill the reactant receiving space 101 to a level above the top end portion of the standpipes 610. The aqueous hydrochloric acid reaction fluid 516 can then enter the top end portion of the standpipe 610, be pulled into the standpipe 610 using gravity, and dispersed out of the fluid dispersing holes 614 directly into the SFAM reactant bed 615, as indicated by the arrows in FIG. 12.

An advantage of the reactor system 600 is that chemical reactions between metals and acids can be improved for reactions where the metal surface area, acid, and other fluids are required to be in consistent contact. For example, in an ACH reaction, where hydrogen gas is produced in large quantities, the hydrochloric acid and other fluid reagents can be directly dispersed into the SFAM reactant bed, expelling hydrogen gas and solvating the SFAM reactant bed. Gaseous hydrogen voids can thus be minimized or eliminated, since the flow of the hydrochloric acid and other fluid reagents through the pellet bed will dispel the hydrogen gas out of the bed.

Another advantage of reactant system 600 is that since SFAM pellets can be used rather than aluminum ingots in the production of ACH, continuous batch to batch processing of ACH can be performed. For example, since the SFAM pellet bed remains hydrated throughout the reaction, the SFAM pellets are consumed to completion, so cleaning of the reactor tank is unnecessary between batches. Instead, fresh SFAM pellets and hydrochloric acid can be continually added to allow continuous batch to batch processing of ACH.

Yet another advantage is that since passive fluid dynamics are used to move the reactant fluids into the metals bed, reactor system 500 is energy efficient.

7. Magnetic Particle (Iron) Filtration System

Figure 3:
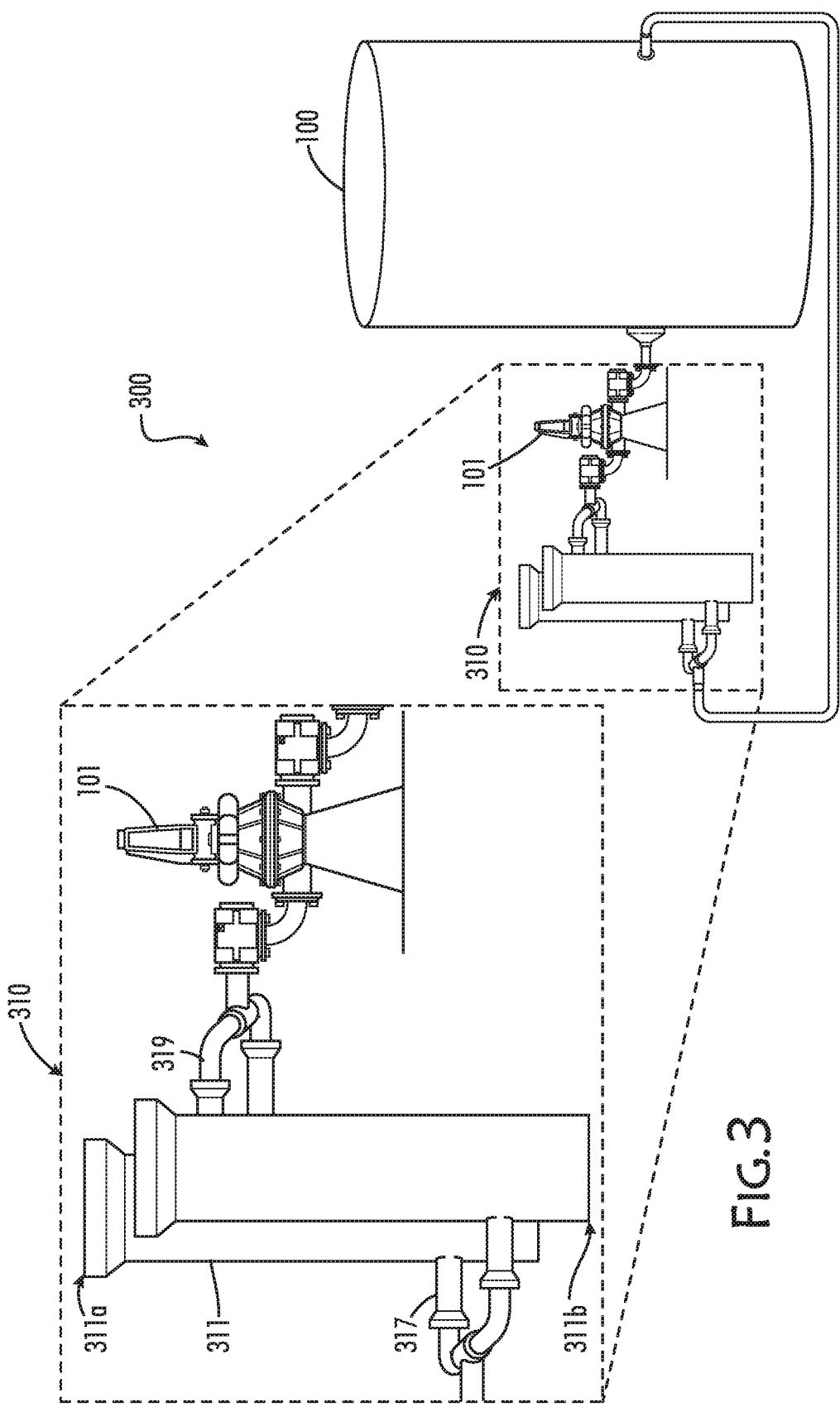
FIG. 3 is a perspective view of a magnetic particle filtration system.

In another aspect, reactor systems described in Sections 1-6 herein can further comprise a magnetic particle filtering system 300 comprising a magnetic filter 310 and a pump 101, such as described in FIG. 3. In some instances, the magnetic particle filtering system 300 comprises two or more magnetic filters 310 connected in series.

Figure 4:
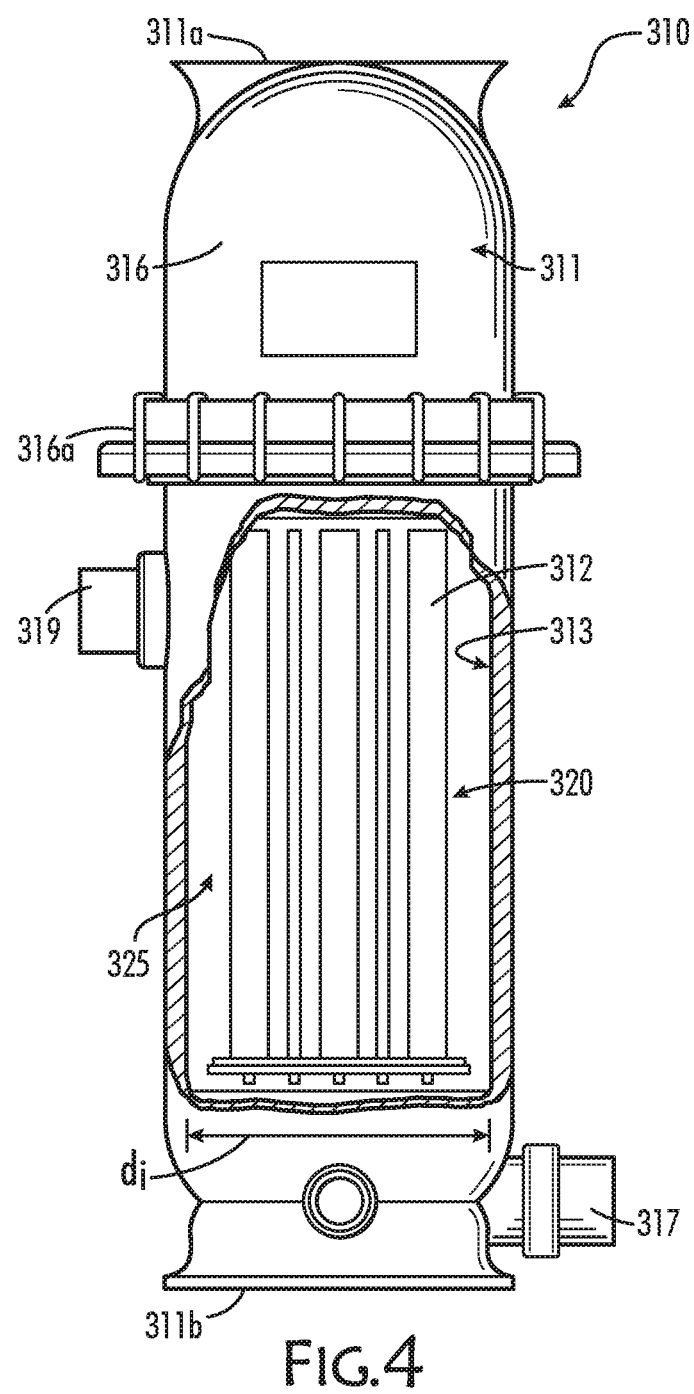
FIG. 4 is a partial cutaway view of a magnetic filter of the magnetic particle filtration system of FIG. 3.

As shown for example in FIGS. 3 and 4, in some embodiments, a magnetic filter 310 comprises a housing 311 and a magnetic cartridge 320. The housing 311 has a magnetic cartridge receiving space 312 formed from an inwardly facing non-corrosive surface 313. The magnetic cartridge receiving space 312 has an inside diameter $d_i$. Length of the magnetic filter 310 can vary depending on the requirements of the magnetic material to be removed and the volume of the removed magnetic material.

In some embodiments, the housing 311 has a first end 311a and an opposite second end 311b. The first end 311a has a cap 316. The cap 316 is removably attached to the first end 311a through any attachment mechanism not inconsistent with the objectives of this disclosure. For example, the cap 316 can be threaded on an inner surface and the first end 311a of the housing 311 can have complementary threading on an outer surface. In another example shown in FIG. 4, the cap 316 can have a flange, and a threaded ring 316a can positioned around the cap 316, the threaded ring 316a engaging the complementary threading on the outer surface of the housing 311.

The housing 311 can also have an input port 317 and an output port 319. In an embodiment, the input port 317 and the output port 319 are positioned apart; the input port 317 being proximate to one of the first end 311a and second end 311b, and the output port 319 being proximate to the end opposite the position of the input port 317. In an embodiment, the input port 317 is positioned proximate to the second end 311b and the output port 319 is positioned proximate to the first end 311a.

In some embodiments, magnetic cartridge 320 is positioned in the magnetic cartridge receiving space 312 of the housing 311. The magnetic cartridge 320 includes a non-corrosive sleeve 321 having an outer diameter $d_o$ and a magnetic sleeve receiving space 322 (see e.g., FIG. 5). The non-corrosive sleeve 321 is made of a material inert to acids, such as PTFE coated stainless steel. However, the skilled artisan would understand that other acid-inert materials could also be used or any other materials not inconsistent with the objectives of this disclosure when acid reagents are not used.

Figure 5:
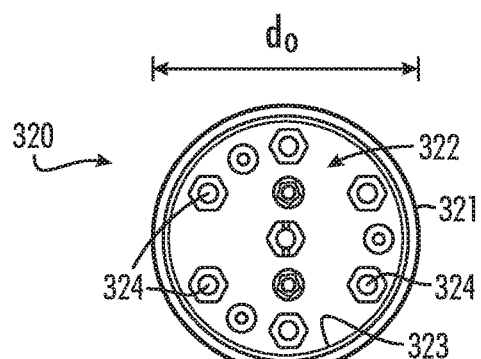
FIG. 5 is a top view of a magnetic cartridge having a magnetic sleeve positioned in an outer sleeve.
Figure 6:
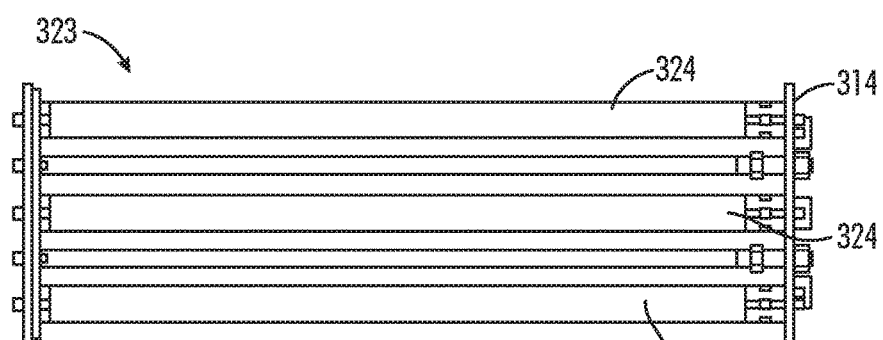
FIG. 6 is a cross-sectional side view of the magnetic sleeve positioned in the outer sleeve of FIG. 5.
Figure 7:
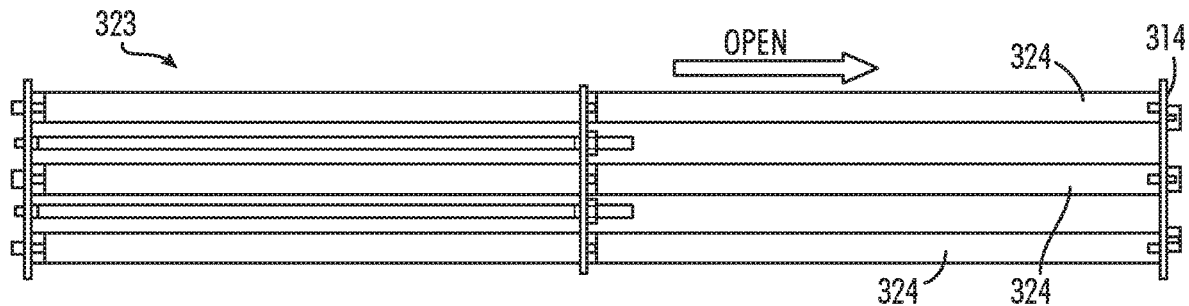
FIG. 7 is a cross-sectional side view of the magnetic sleeve removed from the outer sleeve.

A magnetic sleeve 323 is positioned in the magnetic sleeve receiving space 322, the magnetic sleeve 323 having one or more magnets 324, as shown for example in FIGS. 5-7). In another embodiment, the magnetic cartridge 320 comprises a plurality of magnetic sleeves 323 positioned in the magnetic sleeve receiving space 322. In one instance, the magnetic sleeve 323 is a stainless steel tube, although any materials not inconsistent with the objectives of this disclosure could also be used. As seen in FIGS. 6 and 7, a magnetic sleeve endcap 314 can be connected to an end of the one or more magnets 324. The magnets 324 can neodymium magnets in some cases. In other instances, magnets 324 are electromagnets that can be selectively turned on or off. These magnet types are merely exemplary though, and the skilled artisan would understand that other types of magnets not inconsistent with the objectives of this disclosure can also be used.

In an embodiment, the inside diameter $d_i$ of the housing 311 is greater than the outer diameter $d_o$ of the non-corrosive sleeve, forming a fluid receiving space 325 disposed between the housing 311 and the magnetic cartridge 320. The fluid receiving space 325 has a volume larger than a summed volume of the input port 317 and the output port 319. In an embodiment, the input port 317 is operatively connected to the pump 101, and the output port 319 is operatively connected to the reactor tank 100. Conversely, the input port 317 can be operatively connected to the reactor tank 100, and the output port 319 can be operatively connected to the pump 101.

The pump 101 is operatively connected to the magnetic filter 310 and the reactor tank 100. In an embodiment, the pump 101 is a diaphragm pump. However, the pump 101 can be other types of pumps not inconsistent with the objectives of this disclosure, such as pumps capable of handling particles and sediment, suspended gas (e.g. hydrogen), and corrosive characteristics of harsh acids (e.g., HCl). Pump sizing will depend on the amount of magnetic materials that are to be removed and/or the volume of reactant fluid to be transferred.

8. Method of Using the Magnetic Particle (Iron) Filtration System

In another aspect, a method of using the magnetic particle filtration system 300 of Section 7 to remove magnetic material from a reaction solution is described. A chemical reaction is conducted in a reactor tank 100. The chemical reaction includes a solution having active reagents and magnetic material (e.g. reaction fluid). In an embodiment, the magnetic material is an iron-based catalyst.

During the course of the chemical reaction when the magnetic material is to be removed, the pump 101 is turned on, and the solution from the reactor tank 100 is transferred to the magnetic filter 310. The solution enters the magnetic filter 310 through the input port 317 and into the fluid receiving space 325. Since the volume of the fluid receiving space 325 is larger than the summed volume of the input port 317 and the output port 319, the solution dwells in the fluid receiving space 325 for a measureable amount of time. While in the fluid receiving space 325, the magnetic material 321 is attracted to the magnetic cartridge 320 positioned therein. The magnetic material 321 becomes magnetically bound to (e.g. collected on) the outer surface of the non-corrosive sleeve 321 as the reaction fluid passes through the fluid receiving space 325. In some embodiments, when magnets 324 are electromagnets, methods described herein can comprise energizing the electromagnets 324 to create an electromagnetic field when magnetic filtering is desired, and deenergizing the electromagnets 324 when magnetic filtering is not desired.

The solution can then evacuated from the fluid receiving space 325 of the magnetic filter 300 by exiting through the output port 319, while the magnetic material remains collected on the non-corrosive sleeve 321. The solution then returns to the reactor tank 100.

To remove the magnetic material from the magnetic filter 300, the magnetic cartridge 320 can be removed from the housing. The magnetic cartridge 320 is then disassembled by removing the magnetic sleeve 323 from the non-corrosive sleeve 321. Once the magnetic sleeve 323 is removed, the magnetic field is eliminated from the non-corrosive sleeve 321, and the magnetic material falls from the non-corrosive sleeve 321.

In an embodiment, the pump 101 is connected to operational controls (not shown), permitting automated use of the magnetic filtration system 300. The operational controls provide complete automated control of the timing of magnetic material removal, the amount of magnetic material that is removed, and the duration of the filtration process. Additionally, pneumatic cleaning functionality can be automated.

An advantage of the magnetic particle filtration system is that the magnetic materials can be easily removed from reactions. Another advantage is that since operation of the pump can be automated, removing the magnetic materials does not require active user participation, allowing for easier batch processing and more consistent batch quality. Further advantages are that the time and duration of filtration can also be controlled to achieve variations in reaction products. Moreover, turbidity of the filtered solutions and reactant fluids is reduced compared to unfiltered solutions and reactant fluids.

9. Pellet Filter

In another aspect, reactor systems described in Sections 1-7 herein can comprise a pellet filter 400. As shown for example in FIG. 8, the pellet filter 400 comprises a housing 411 and a filter 420. The housing 411 has a filter receiving space 412 into which the filter 420 is positionable.

In some embodiments, housing 411 has a first end 411a and an opposite second end 411b. The first end 411a has a cap 416. The cap 416 is removably attached to the first end 411a through any attachment mechanism not inconsistent with the objectives of this disclosure. For example, the cap 416 can be threaded on an inner surface and the first end 411a of the housing 411 can have complementary threading on an outer surface. In another example shown in FIG. 8, the cap 416 can have a flange, and a threaded ring 416a can positioned around the cap 416, the threaded ring 416a engaging the complementary threading on the outer surface of the housing 411.

Figure 8:
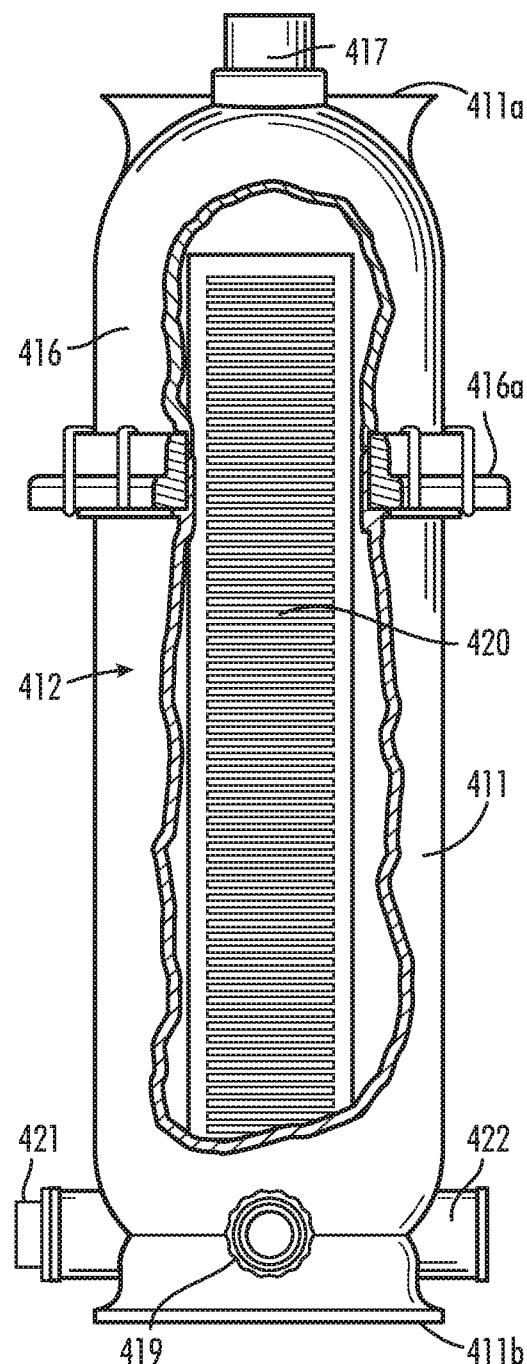
FIG. 8 is a partial cutaway view of a pellet filter.
Figure 9:
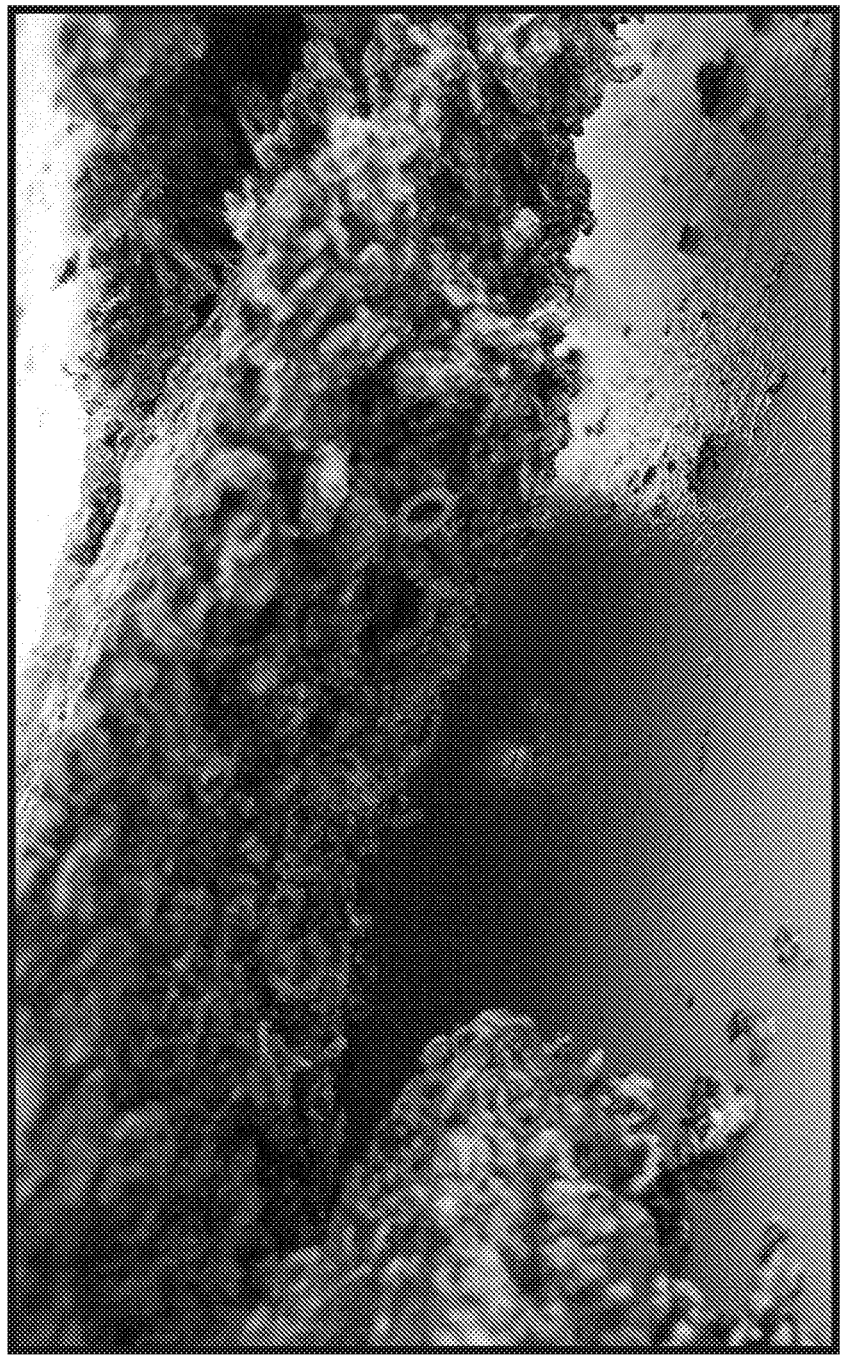
FIG. 9 is a picture of a coalesced aluminum byproduct traditionally formed when using small form aluminum metal (SFAM)

In some embodiments, housing 411 can also have an input port 417, and a output port 419. The housing can optionally have a flushing output port 421 and a flushing input port 422. In an embodiment, the input port 417 is positioned on the cap 416, such as at a top of cap 416, as shown in FIG. 8, or on a side of cap 416. In an embodiment, the output port 419 is positioned proximate the second end 411b of the housing 411. The flushing output port 421 and the flushing input port 422 can be positioned on the same end of the housing 411, such as the second end 411b.

The filter 420 can be any filter not inconsistent with the objectives of this disclosure. In an embodiment, the filter 420 is cylindrical having a plurality of filtering passageways 423. The size, shape, number, and position of the filtering passageways 423 can be varied in any manner not inconsistent with the objectives of this disclosure, and can be adapted for particular applications (e.g., the type of solids being filtered). In some aspects, the filter 420 has a hollow interior that is in fluid communication with the output port 419 such that fluid 205 entering the pellet filter 400 from the input port 417 will first pass through the filter 420 before exiting the pellet filter at the output port 419, leaving solids from the fluid 205 in the pellet filter 400.

Solids accumulating in the pellet filter 400 can be flushed from the pellet filter 400 by shutting off the supply of fluid 205 entering the pellet filter 400 through the input port 417. The flushing output port 421 can be opened and fluid can be pumped into the flushing input port 422, evacuating the accumulated solids out of the pellet filter 400 through the flushing output port 421.

In some embodiments, reactor systems described herein can further comprise a sock filter positioned in series with a pellet filter described herein. In these embodiments, the sock filter acts as a prefilter to the pellet filter and is positioned in series between the pellet filter and the reactor tank.

Figure 14:
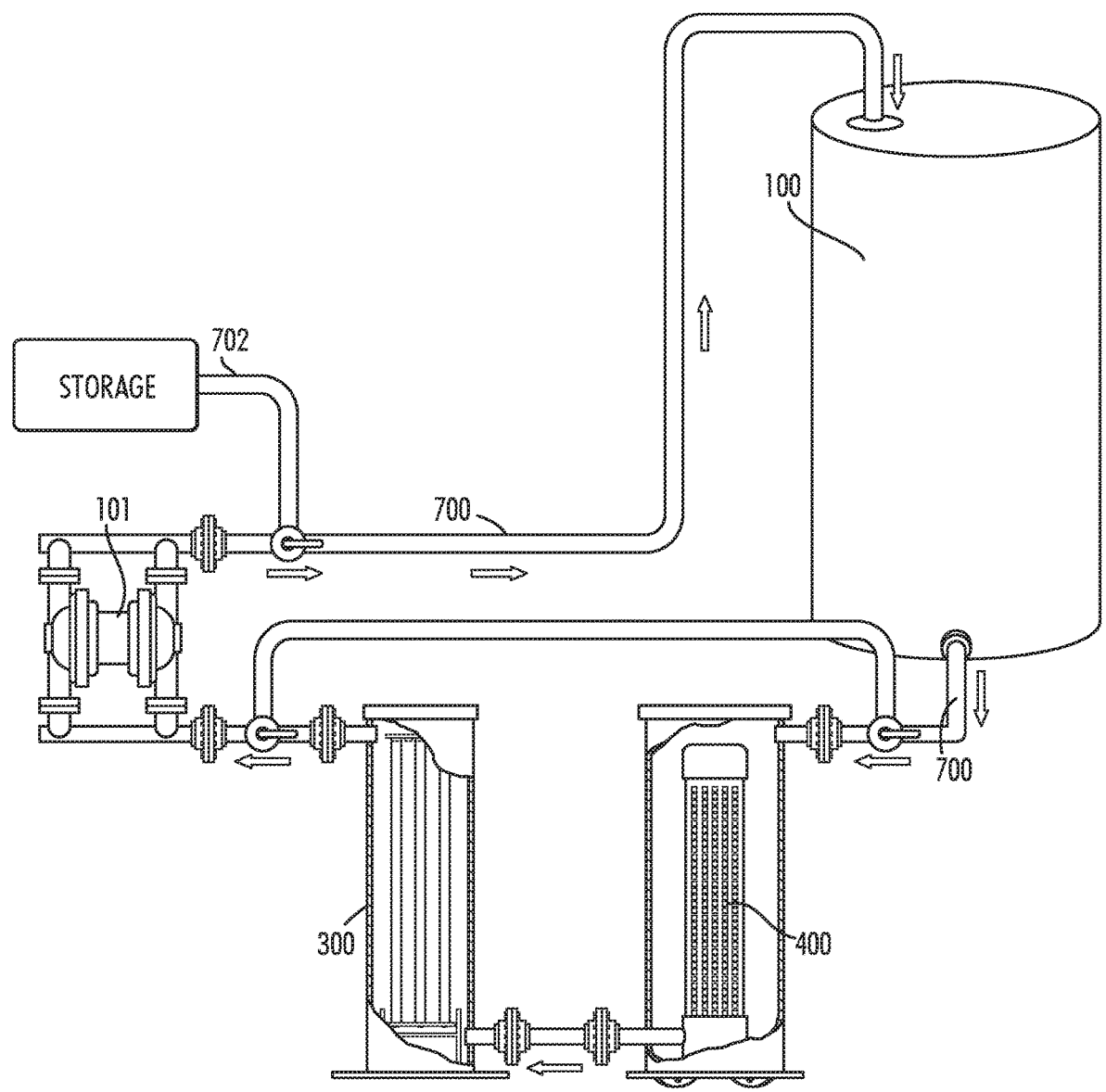
FIG. 14 is a reactor system showing fluid flow through a pellet filter, magnetic particle filtration system, and a pump.

10. Reactor Systems Having a Magnetic Particle Filtration System and Pellet Filter In another aspect, reactor systems described in Sections 1-6 can comprise a magnetic particle filtration system described in Sections 7 and 8 herein, and a pellet filter described in Section 9 herein. In the embodiments shown in FIGS. 14 and 15, pellet filter 400, magnetic particle filtration system 300, and pump 101 are fluidly connected to reactor tank 100 via conduit or pipes 700. In FIG. 14, pellet filter 400 and magnetic particle filtration system 300 are connected in series, and reactant fluid and solutions from reactor tank 100 pass from the reactor tank 100 to the pellet filter 400 (as indicated by the arrows), where particulates are filtered out of the reactant fluid. The filtered reactant fluid then passes to the magnetic particle filtration system 300, where, when the magnets 324 are magnetized, magnetic particles can be removed. From the magnetic particle filtration system 300, the filtered reactant fluid can then be transferred through pump 101 back into reactor tank 100. The precise location in the filtered reactant fluid is returned into the reactor tank 100 will vary depending on the particular reactor system of Sections 1-6 being present in the reactor tank 100. For example, if the reactor system is a hydration floor 200 or 200' with standpipes 27 as described in Section 4, or the reactor system with standpipes described in Section 6, the filtered reactant fluid can be released into the reactant receiving space 101 of the reactor tank 100 above the reactant bed. However, if the reactor system is a monolithic hydration floor 200' without standpipes as described in Section 4 herein, the filtered reactant fluid can be pumped directly into the fluid receiving space 30 under the hydration floor 200'. Furthermore, if the reactor system is uses a plurality of fluid dispersing pipes 510 as described in Section 5 herein, the filtered reactant fluid can be pumped directly into the fluid supplying pipe 512.

Figure 15:
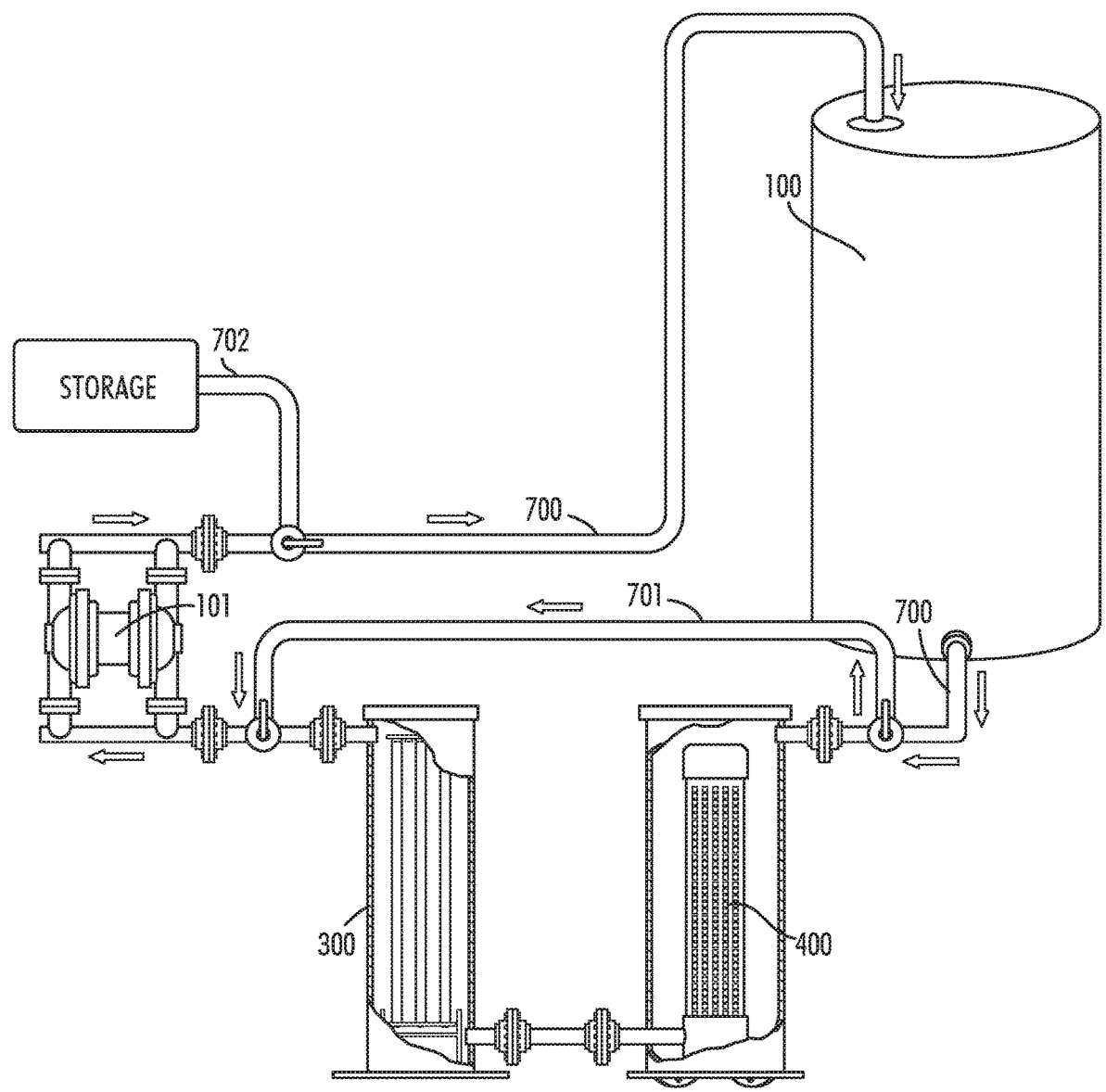
FIG. 15 is the reactor system of FIG. 14, showing fluid flow bypassing the pellet filter and magnetic particle filtration system.

FIG. 15 represents fluid flow through a bypass conduit 701 when filtration of the reactant fluid is not desired or necessary.

Optionally, in some embodiments, an exiting conduit 702 can be connected to one of the conduit 700, such as after pump 101. When a reaction is complete, a reaction product from reactor tank 100 can be pumped to a separate storage tank.

In some embodiments, reactor systems described herein can further comprise a sock filter positioned in series with a pellet filter and magnetic particle filtration system described herein. In these embodiments, the sock filter acts as a prefilter to both the pellet filter and the magnetic particle filtration system, and is positioned in series between the pellet filter and the reactor tank.

11. Methods of Producing Aluminum Chlorohydrate

In another aspect, a method of producing aluminum chlorohydrate comprises adding SFAM pellets to a reactant receiving space of a reactor tank to form a pellet bed; adding aqueous hydrochloric acid to the reactant receiving space of the reactor tank; and continuously circulating the aqueous hydrochloric acid through the pellet bed. In some embodiments, the continuously circulating aqueous hydrochloric acid dispels reaction gases from the pellet bed, allowing for continuous solvation of the SFAM pellets. In some cases, the method can further comprise consecutively adding additional small form aluminum metal pellets to the reactant receiving space of the reactor tank as the small form aluminum metal pellets are consumed in the pellet bed. Moreover, in some cases, the method can further comprise consecutively adding additional aqueous hydrochloric acid to the reactant receiving space of the reactor tank as the aqueous hydrochloric acid is converted into aluminum chlorohydrate.

In embodiments comprising a hydration floor, a process or method for producing aluminum chlorohydrate comprises: adding small form aluminum metal (SFAM) pellets to the hydration floor 200 in a reactor tank 100 to form a pellet bed positioned on the hydration floor 200; adding an aqueous acid reagent to the reactor tank 100 to cover the pellet bed and first end 27a of the standpipe 27.

The aqueous acid reagent is passively moved through the standpipe 27 into the fluid receiving space 30 of the body 10 using fluid dynamics of the aqueous acid reagent; and passively moved from the fluid receiving space 30 through the fluid transfer openings 22 of the body 10 into the base of the pellet bed. In an embodiment the aqueous acid reagent is actively moved through the standpipe 27 using a pump, such as pump 101.

Similarly for embodiments comprising reactor system 600 having one or more standpipes 610, the aqueous acid reagent is passively moved through the standpipe 610 directly into the pellet bed through the fluid dispersing holes 614. This release into the pellet bed forces the aqueous acid reagent into the pellet bed, and ultimately back into the reactant receiving space 101.

In an embodiment, when the monolithic hydration floor 200' is used without standpipes 27, one or more pumps can be used to actively move the aqueous acid reagent from reactant receiving space 101, and pump the aqueous acid reagent into the fluid receiving space 30. This release into the fluid receiving space 30 forces the aqueous acid reagent up through the fluid passing holes 22 into the pellet bed, and back into the reactant receiving space 101.

In another embodiment, reactor system 500 is used with a plurality of fluid dispersing pipes 510, one or more pumps can be used to actively move the aqueous acid reagent from reactant receiving space 101, and pump the aqueous acid reagent into fluid dispersing pipes 510 and release the aqueous acid reagent out of the fluid dispersing holes 514. This release into the pellet bed forces the aqueous acid reagent into the pellet bed, and ultimately back into the reactant receiving space 101.

The pump 101 is operatively connected to the reactor tank 100 and the magnetic filter 310, and actively pulls the reaction fluid from the reactor tank to the magnetic filter 310. The aqueous acid reagent then passes through a fluid receiving space 325 of a magnetic filter 310, where the magnetic reaction material collects on an outer surface of the non-corrosive sleeve of the magnetic filter. The collected reaction fluid is evacuated from fluid receiving space of the magnetic filter while the magnetic reaction material remains collected on the non-corrosive sleeve. After passing the reaction fluid through the fluid receiving space of the magnetic filter, the reaction fluid is returned to the reactor tank.

To remove the magnetic reaction material, the pump 101 is turn off, and the magnetic sleeve is removed from the non-corrosive sleeve. This eliminates the magnetic field applied to the non-corrosive sleeve, so the magnetic reaction material disposed on the non-corrosive sleeve is easily removed in the absence of the magnetic sleeve. Optionally, the pellet filter 400 is positioned between the reactor tank 100 and the magnetic filter 310, filtering out solids from the reaction fluid prior to the reaction fluid entering the magnetic filter 310.

EXAMPLE

Aluminum Chlorohydrate Preparation Using Small Form Aluminum Metal

ACH was prepared using SFAM in a reactor system described in Section 4 herein using hydration floor 200 having a plurality of standpipes 27. Approximately 18,000 lbs. of SFAM (standard P1020 aluminum with ~20 ppm of iron naturally present) was placed on the reactant facing surface of the hydration floor in a reactor tank to form a bed of SFAM. Vertically extending standpipes connected to the hydration floor were embedded in the SFAM bed, and first end extended out of the top of the SFAM bed. Approximately 3600 gallons of water was added to the reactor tank, submerging the bed of SFAM. Then, approximately 1800 gallons of aqueous HCl was added to the water. The addition of HCl was added incrementally and a final aqueous 20% HCl solution submerged both the SFAM bed and the first end of the standpipes. Within 24 hours the ACH reaction reached completion.

Figure 16:
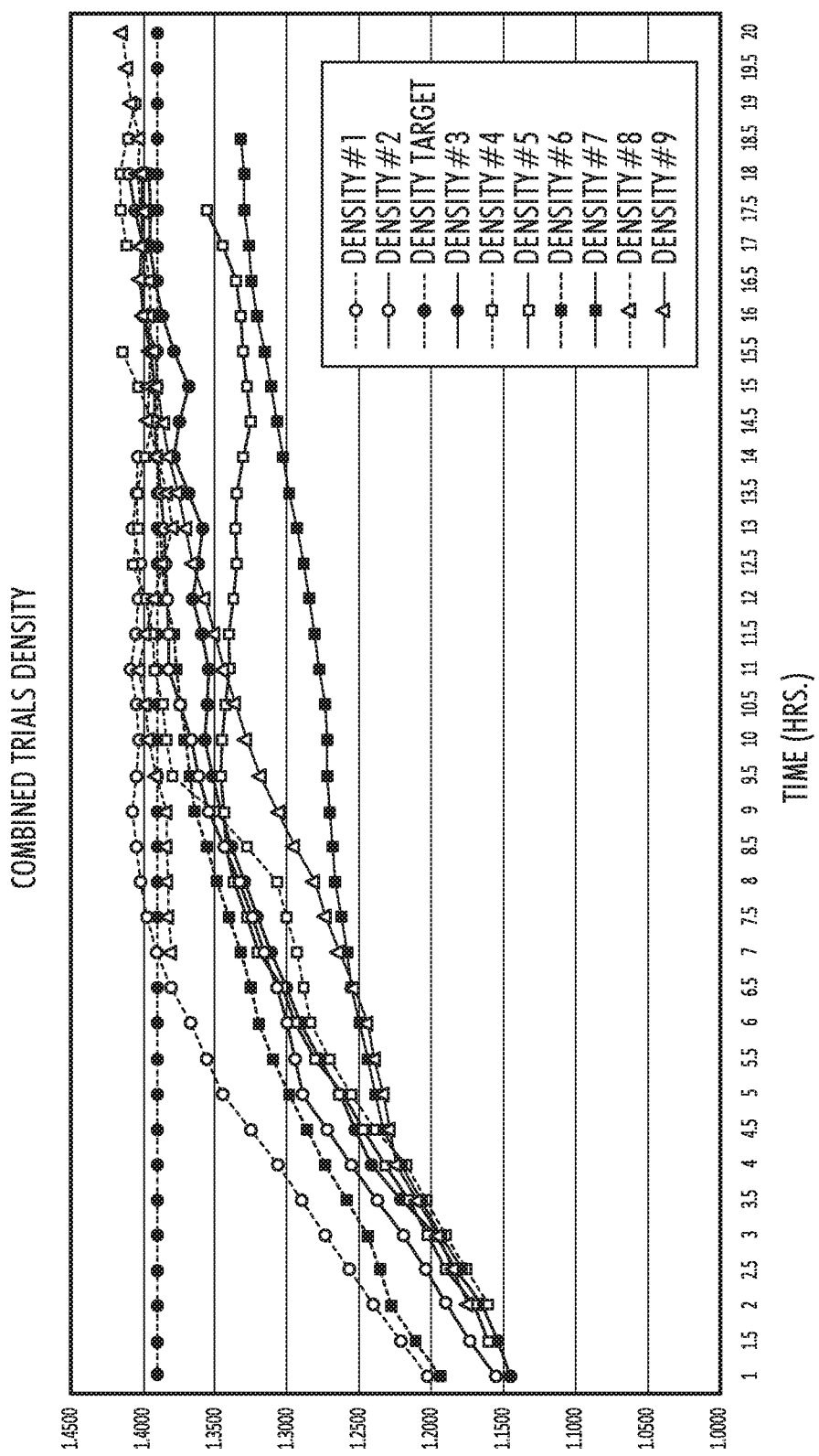
FIG. 16 is a graphical illustration of a solution density changes over time for nine different ACH reactions.
Figure 17:
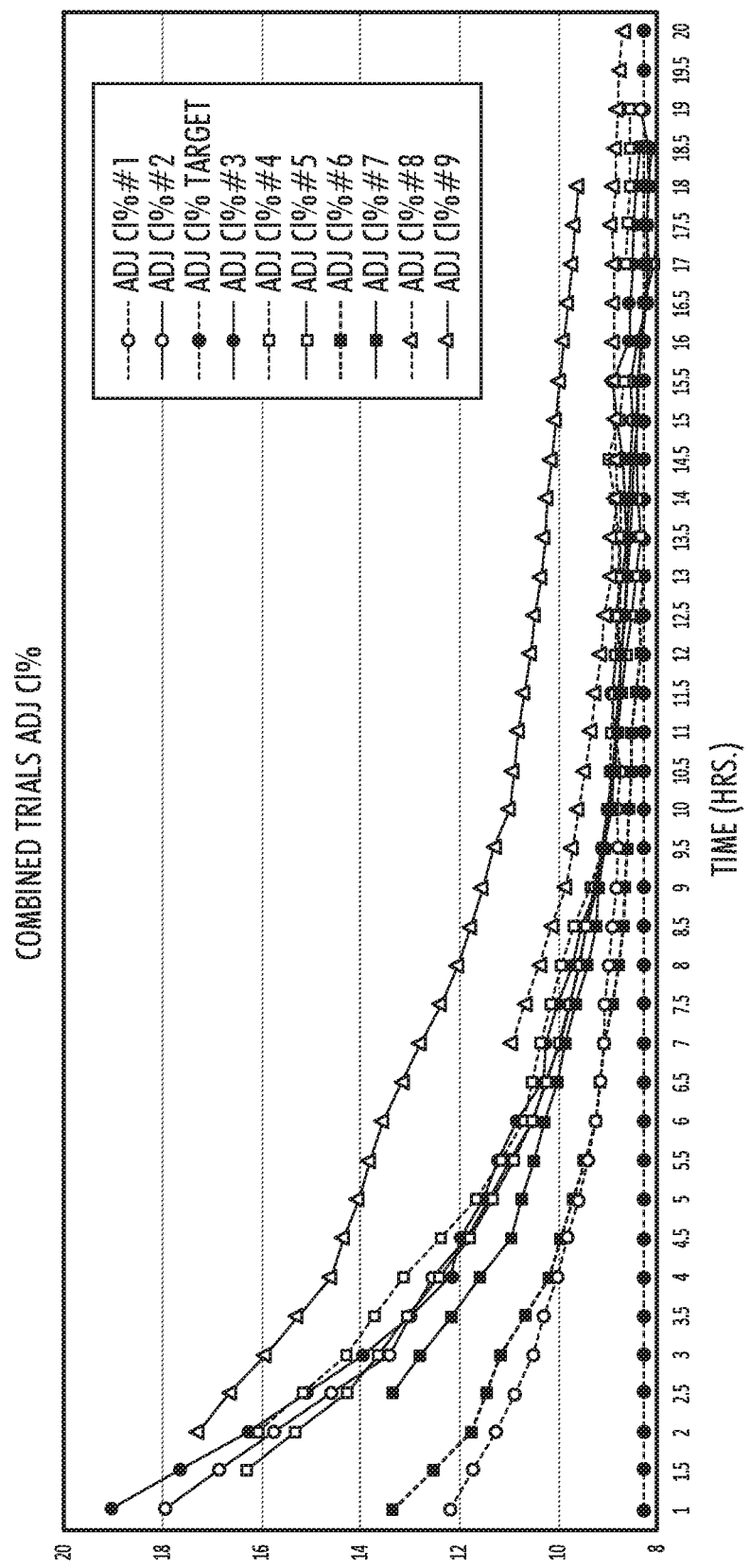
FIG. 17 is a graphical illustration of chloride percentage changes over time for nine different ACH reactions.
Figure 18:
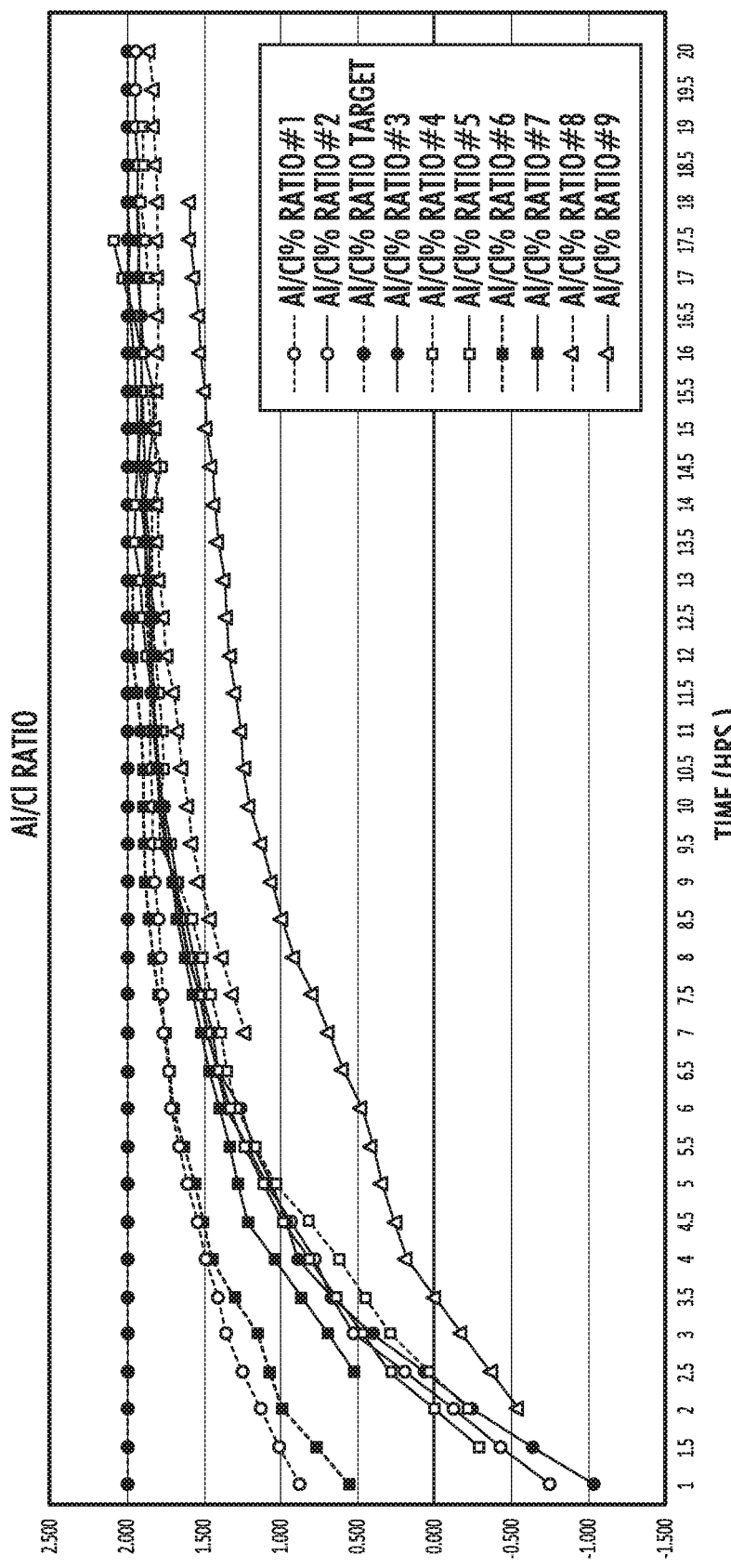
FIG. 18 is a graphical illustration of aluminum to chloride ratio changes over time for nine different ACH reactions.

FIGS. 16-18 describe changes over time of solution densities, solution chloride percentages, and solution aluminum/chloride ratios, respectively, for nine separate ACH batches prepared according to this EXAMPLE. As shown in FIGS. 16-18, in less than 24 hours, a target density of the ACH reaction was observed, a target chloride percentage (Cl %) was observed, and a target aluminum/chloride ratio was observed, indicating the ACH reaction using SFAM had completed.

EMBODIMENTS

The following embodiments describe various additional and alternative aspects and configurations of devices and methods of using small form aluminum in consecutive batch to batch aluminum chlorohydrate processes described herein.

Embodiment 1. A magnetic particle filtering system comprising:
  one or more magnetic filters having:
    a housing having a magnetic cartridge receiving space formed from an inwardly facing non-corrosive surface, the magnetic cartridge receiving space having an inside diameter, and
    a magnetic cartridge positioned in the magnetic cartridge receiving space, the magnetic cartridge comprising:
      a non-corrosive sleeve having an outer diameter and a magnetic sleeve receiving space, and
      a magnetic sleeve positioned in the magnetic sleeve receiving space, the magnetic sleeve having one or more magnets, and
      a fluid receiving space disposed between the housing and the magnetic cartridge; and
  a pump operatively connected to the magnetic filter.

Embodiment 2. The system of Embodiment 1, wherein the inside diameter of the housing is greater than the outer diameter of the non-corrosive sleeve.

Embodiment 3. The system of Embodiment 1, wherein the magnetic sleeve comprises one or more magnets.

Embodiment 4. The system of Embodiment 3, wherein the magnets are neodymium magnets.

Embodiment 5. The system of Embodiment 3, wherein the magnetic sleeve is a stainless steel tube.

Embodiment 6. The system of Embodiment 1, comprising a plurality of magnetic sleeves positioned in the magnetic sleeve receiving space.

Embodiment 7. The system of Embodiment 1, wherein the non-corrosive sleeve is inert to acids.

Embodiment 8. The system of Embodiment 7, wherein the non-corrosive sleeve is made from PTFE coated stainless steel.

Embodiment 9. The system of Embodiment 1, the housing further comprising:
  a first end;
  a cap positioned on the first end;
  an opposite second end;
  an input port; and
  an output port.

Embodiment 10. The system of Embodiment 9, wherein the input port and the output port are positioned apart, the input port being proximate to one of the first end and second end, and the output port being proximate to the end opposite the input port.

Embodiment 11. The system of Embodiment 10, wherein the fluid receiving space has a volume larger than a summed volume of the input port and the output port.

Embodiment 12. The system of Embodiment 9, wherein the output port is operatively connected to the pump.

Embodiment 13. The system of Embodiment 12, wherein the pump is operatively connected to a reactor tank.

Embodiment 14. The system of Embodiment 12, wherein the input port is operatively connected to a reactor tank.

Embodiment 15. A magnetic particle filtering system comprising:
a magnetic filter; and
a pump operatively connected to the magnetic filter.

Embodiment 16. The system of Embodiment 15, wherein the magnetic filter comprises a housing having a magnetic cartridge receiving space formed from an inwardly facing non-corrosive surface, the magnetic cartridge receiving space having an inside diameter.

Embodiment 17. The system of Embodiment 16, wherein the magnetic filter comprises a magnetic cartridge positioned in the magnetic cartridge receiving space.

Embodiment 18. The system of Embodiment 17, wherein the magnetic cartridge comprises a non-corrosive sleeve having an outer diameter and a magnetic sleeve receiving space.

Embodiment 19. The system of Embodiment 18, wherein the magnetic cartridge comprises a magnetic sleeve positioned in the magnetic sleeve receiving space.

Embodiment 20. The system of Embodiment 19, wherein the magnetic sleeve comprises one or more magnets.

Embodiment 21. The system of Embodiment 20, wherein a fluid receiving space disposed between the housing and the magnetic cartridge.

Embodiment 22. A process for removing magnetic material from a reaction, comprising:
passing reaction fluid through a fluid receiving space of a magnetic filter, the magnetic filter having:
 a housing having a magnetic cartridge receiving space formed from an inwardly facing non-corrosive surface, the magnetic cartridge receiving space having an inside diameter,
 a magnetic cartridge positioned in the magnetic cartridge receiving space, the magnetic cartridge comprising:
  a non-corrosive sleeve having an outer diameter and a magnetic sleeve receiving space, and
  a magnetic sleeve positioned in the magnetic sleeve receiving space, the magnetic sleeve having one or more magnets;
 collecting the magnetic material on an outer surface of the non-corrosive sleeve; and
 evacuating the collected reaction fluid from fluid receiving space of the magnetic filter while the magnetic material remains collected on the non-corrosive sleeve.

Embodiment 23. The process of Embodiment 22, wherein the housing further comprises: an input port; and an output port.

Embodiment 24. The process of Embodiment 16, wherein the output port is operatively connected to the pump.

Embodiment 25. The process of Embodiment 17, wherein the pump is operatively connected to a reactor tank.

Embodiment 26. The process of Embodiment 18, wherein the input port is operatively connected to a reactor tank.

Embodiment 27. The process of Embodiment 22, further comprising removing the magnetic cartridge from the housing.

Embodiment 28. The process of Embodiment 27, further comprising removing the magnetic sleeve from the non-corrosive sleeve.

Embodiment 29. The process of Embodiment 28, further comprising removing the magnetic material disposed on the non-corrosive sleeve in the absence of the magnetic sleeve.

Embodiment 30. A hydration plate comprising a body having:
a reactant facing surface;
an opposite floor facing surface;
a fluid receiving space positioned in the body;
a plurality of fluid passing holes positioned through the reactant facing surface, each fluid passing hole being operatively connected to the fluid receiving space; and
a standpipe receiving hole positioned in the reactant facing surface, the standpipe receiving hole being in fluid communication with the fluid receiving space.

Embodiment 31. The hydration plate of Embodiment 30, further comprising one or more connection tabs positioned on the reactant facing surface, each connection tab being removably connectable to a lifting mechanism.

Embodiment 32. The hydration plate of Embodiment 30, further comprising a standpipe connecting sleeve positioned in the standpipe receiving hole, the standpipe connecting sleeve having a shape complementary to fluid exiting end of a standpipe.

Embodiment 33. The hydration plate of Embodiment 32, wherein the standpipe connecting sleeve is removably positioned in the standpipe receiving hole.

Embodiment 34. The hydration plate of Embodiment 32, wherein the standpipe connecting sleeve is permanently positioned in the standpipe receiving hole.

Embodiment 35. The hydration plate of Embodiment 30, wherein each hydration plate has a complementary shape to each of the other hydration plates.

Embodiment 36. The hydration plate of Embodiment 30, wherein each hydration plate is pie-shaped.

Embodiment 37. A modular hydration floor comprising:
a plurality of hydration plates, each hydration plate comprising a body having:
 a reactant facing surface,
 an opposite floor facing surface,
 a fluid receiving space positioned in the body,
 a plurality of fluid passing holes positioned through the reactant facing surface, each fluid passing hole being operatively connected to the fluid receiving space, and
 a standpipe receiving hole positioned in the reactant facing surface, the standpipe receiving holes being in fluid communication with the fluid receiving space; and
a standpipe having:
 a first end,
 a solids excluding cap positioned on first end, and
 a fluid exiting end complimentary in shape to the standpipe receiving hole and being removeably receivable therein.

Embodiment 38. The modular hydration floor of Embodiment 37, wherein each hydration plate has a complementary shape to each of the other hydration plates.

Embodiment 39. The modular hydration floor of Embodiment 37, wherein each hydration plate is pie-shaped.

Embodiment 40. The modular hydration floor of Embodiment 37, wherein each hydration plate can be connected to another hydration plate.

Embodiment 41. The modular hydration floor of Embodiment 40, wherein corresponding fluid transfer openings of connected hydration plates are in fluid communication.

Embodiment 42. The modular hydration floor of Embodiment 41, wherein each standpipe is in fluid communication with the plurality of fluid passing holes through the fluid receiving space.

Embodiment 43. The modular hydration floor of Embodiment 40, wherein a plurality of connected hydration plates forms a false floor covering the base of a reactor tank.

Embodiment 44. A reactor system comprising,
a reactor tank having a reactant receiving space and a bottom floor;

a hydration floor positioned in the reactant receiving space proximate to the bottom floor, the hydration floor having:
　a plurality of connected hydration plates, each hydration plate comprising a body having:
　　a reactant facing surface,
　　an opposite floor facing surface,
　　a fluid receiving space positioned in the body,
　　a plurality of fluid passing holes positioned through the reactant facing surface, each fluid passing hole being operatively connected to the fluid receiving space, and
　　a standpipe receiving hole positioned in the reactant facing surface, the standpipe receiving hole being in fluid communication with the fluid receiving space; and
　a standpipe having:
　a first end,
　a solids excluding cap positioned on first end, and
　a fluid exiting end complimentary in shape to the standpipe receiving hole and being removably receivable therein.

Embodiment 45. The reactor system of Embodiment 44, wherein the fluid transfer conduits of connected hydration plates are in fluid communication.

Embodiment 46. The reactor system of Embodiment 45, wherein each standpipe is in fluid communication with the plurality of fluid passing holes through the fluid transfer conduits.

Embodiment 47. The reactor system of Embodiment 44, wherein the plurality of connected hydration plates forms a false floor positioned over the bottom floor of the reactor tank.

Embodiment 48. The reactor system of Embodiment 44, wherein when a fluid is placed in the reactant receiving space of the reactor tank, passive fluid dynamics move the fluid through the standpipe into the fluid receiving space of the hydration plates, through the fluid receiving space to the fluid passing holes of the hydration plates, and through the fluid passing holes to return back into the reactant receiving space.

Embodiment 49. A process for producing aluminum chlorohydrate, comprising:
　adding small form aluminum metal pellets to a hydration floor in a reactor tank to form a pellet bed positioned on the hydration floor;
　adding an aqueous acid reagent to the reactor tank to cover the pellet bed and a first end of the standpipe.

Embodiment 50. The process of Embodiment 49, wherein the hydration floor comprises:
　a plurality of hydration plates, each hydration plate comprising a body having:
　　a reactant facing surface,
　　an opposite floor facing surface,
　　a fluid receiving space positioned in the body,
　　a plurality of fluid passing holes positioned through the reactant facing surface, each fluid passing hole being operatively connected to the fluid receiving space, and
　　a standpipe receiving hole positioned in the reactant facing surface, the standpipe receiving hole being in fluid communication with the fluid receiving space; and
　a standpipe having:
　a first end, and
　an opposite fluid exiting end complimentary in shape to the standpipe receiving hole.

Embodiment 51. The process of Embodiment 49, further comprising: passively moving the aqueous acid reagent through the standpipe into the fluid receiving space of the body.

Embodiment 52. The process of Embodiment 51, further comprising: passively moving the aqueous acid reagent from the fluid receiving space through the fluid transfer openings of the body into the base of the pellet bed.

Embodiment 53. The process of Embodiment 52, further comprising: passing reaction fluid through a fluid receiving space of a magnetic filter.

Embodiment 54. The process of Embodiment 53, wherein the magnetic filter comprises:
　a housing having a magnetic cartridge receiving space formed from an inwardly facing non-corrosive surface, the magnetic cartridge receiving space having an inside diameter; and
　a magnetic cartridge positioned in the magnetic cartridge receiving space, the magnetic cartridge comprising:
　　a non-corrosive sleeve having an outer diameter and a magnetic sleeve receiving space, and
　　a magnetic sleeve positioned in the magnetic sleeve receiving space, the magnetic sleeve having one or more magnets.

Embodiment 55. The process of Embodiment 54, further comprising: collecting the magnetic material on an outer surface of the non-corrosive sleeve.

Embodiment 56. The process of Embodiment 55, further comprising: evacuating the collected reaction fluid from fluid receiving space of the magnetic filter while the magnetic material remains collected on the non-corrosive sleeve.

Embodiment 57. The process of Embodiment 56, further comprising removing the magnetic sleeve from the non-corrosive sleeve.

Embodiment 58. The process of Embodiment 57, further comprising removing the magnetic material disposed on the non-corrosive sleeve in the absence of the magnetic sleeve.

Embodiment 59. The process of Embodiment 53, wherein a pump is operatively connected to the reactor tank and the magnetic filter, and actively passes the reaction fluid from the reactor tank to the magnetic filter.

Embodiment 60. The process of Embodiment 53, wherein after passing the reaction fluid through the fluid receiving space of the magnetic filter, the reaction fluid is returned to the reactor tank.

Embodiment 61. A hydration floor comprising:
　a reactant facing surface;
　an opposite reactor floor facing surface; and
　a plurality of fluid passing holes positioned through the reactant facing surface.

Embodiment 62. The hydration floor of Embodiment 61, further comprising a standpipe receiving hole.

Embodiment 63. The hydration floor of Embodiment 62, wherein the standpipe receiving through hole.

Embodiment 64. The hydration floor of Embodiment 63, further comprising a standpipe positioned in the standpipe receiving hole.

Embodiment 65. A pellet filter comprising
　a housing having a filter receiving space; and
　a filter positioned in the filter receiving space.

Embodiment 66. A reactor system comprising a reactor tank having a reactant receiving space and a bottom floor.

Embodiment 67. The reactor system of Embodiment 66, further comprising a hydration floor positioned in the reactant receiving space proximate to the bottom floor, the hydration floor comprising a plurality of fluid passing holes.

Embodiment 68. The reactor system of Embodiment 67, wherein the hydration floor comprising:
a reactant facing surface; and
an opposite reactor floor facing surface,
wherein the plurality of fluid passing holes extend through the hydration floor from the reactant facing surface and the reactor floor facing surface.

Embodiment 69. The reactor system of Embodiment 68, further comprising a plurality of standpipes positioned on the hydration floor.

Embodiment 70. The reactor system of Embodiment 69, wherein the plurality of standpipes extend outward from the reactant facing surface of the hydration floor.

Embodiment 71. The reactor system of Embodiment 67, wherein the hydration floor is a hydration floor comprising any of Embodiments 30-36.

Embodiment 72. The reactor system of Embodiment 67, wherein the hydration floor is a modular hydration floor comprising any of Embodiments 37-43.

Embodiment 73. The reactor system of Embodiment 66, further comprising:
a manifold; and
a plurality of fluid dispersing pipes positioned proximate to the bottom floor and fluidly connected to the manifold.

Embodiment 74. The reactor system of Embodiment 73, further comprising a fluid supplying pipe fluidly connected to the manifold.

Embodiment 75. The reactor system of Embodiment 73, further comprising a hydration floor described in Embodiment 67 or Embodiment 68.

Embodiment 76. The reactor system of Embodiment 75, wherein the plurality of fluid dispersing pipes are positioned on a reactant facing surface side of the hydration floor.

Embodiment 77. The reactor system of Embodiment 66, further comprising a plurality of standpipes connected to the bottom floor of the reactor tank.

Embodiment 78. The reactor system of Embodiment 77, wherein each standpipe comprises a plurality of fluid dispersing holes positioned along a length of the standpipe.

Embodiment 79. The reactor system of any of Embodiments 66 to 78, further comprising a magnetic particle filtering system of Embodiments 1-21 fluidly connected to the reactor tank.

Embodiment 80. The reactor system of Embodiment 79, further comprising a pellet filter of Embodiment 65, the pellet filter being fluidly connected to the reactor tank and the magnetic particle filtering system and being positioned therebetween.

Embodiment 81. The reactor system of Embodiments 79 or 80, further comprising a pump fluidly connected to the reactor tank.

Embodiment 82. A process for producing aluminum chlorohydrate, comprising:
adding small form aluminum metal pellets to reactant receiving space of a reactor tank described in any of Embodiments 66 to 81 to form a pellet bed; and
adding aqueous hydrochloric acid to the reactor tank.

Embodiment 83. The process of Embodiment 82, further comprising continuously circulating the aqueous hydrochloric acid through the pellet bed.

The invention claimed is:

1. A method of producing aluminum chlorohydrate, comprising:
adding small form aluminum metal pellets to a reactant receiving space of a reactor tank to form a pellet bed;
adding aqueous hydrochloric acid to the reactant receiving space of the reactor tank; and
continuously circulating the aqueous hydrochloric acid through the pellet bed, wherein at least a portion of the aqueous hydrochloric acid is dispersed directly into the pellet bed, and subsequently returned to the reactant receiving space.

2. The method of claim 1, wherein the continuously circulating aqueous hydrochloric acid dispels reaction gases from the pellet bed.

3. The method of claim 1, further comprising consecutively adding additional small form aluminum metal pellets to the reactant receiving space of the reactor tank as the small form aluminum metal pellets are consumed in the pellet bed.

4. The method of claim 3, further comprising consecutively adding additional aqueous hydrochloric acid to the reactant receiving space of the reactor tank as the aqueous hydrochloric acid is converted into aluminum chlorohydrate.

5. The method of claim 1, wherein the reactor tank comprises a hydration floor positioned proximate to a bottom floor of the reactor tank.

6. The method of claim 5, wherein the hydration floor comprises:
a pellet bed facing surface;
an opposite reactor floor facing surface; and
a plurality of fluid passing holes extending through the hydration floor from the pellet bed facing surface and the reactor floor facing surface.

7. The method of claim 6, wherein the hydration floor comprises one or more standpipes extending away from the pellet bed facing surface, the standpipes being in fluid communication with the reactant receiving space of the reactor tank on the pellet bed facing surface side of the hydration floor and the reactant receiving space of the reactor tank on the reactor floor facing surface side of the hydration floor.

8. The method of claim 7, wherein the aqueous hydrochloric acid is continuously circulated through the one or more standpipes from the reactant receiving space on the pellet bed facing surface side of the hydration floor to the reactant receiving space on the reactor floor facing surface side of the hydration floor.

9. The method of claim 8, wherein the aqueous hydrochloric acid is continuously circulated through the one or more standpipes using gravity.

10. The method of claim 8, wherein the pellet bed is positioned on the pellet bed facing surface of the hydration floor, and the aqueous hydrochloric acid continuously circulates from the reactant receiving space on the reactor floor facing surface side of the hydration plate through the plurality of fluid passing holes into the pellet bed.

11. The method of claim 6, wherein the hydration floor comprises a plurality of hydration plates.

12. The method of claim 11, wherein each hydration plate has a shape complimentary to each of the other hydration plates, and the plurality of hydration plates are connectable to form the hydration floor.

13. The method of claim 11, wherein one or more of the plurality of hydration plates comprises one or more standpipes.

14. The method of claim 6, wherein the aqueous hydrochloric acid is continuously circulated through the pellet bed by pumping aqueous hydrochloric acid from a reactant receiving space of the reactor tank on the pellet bed facing surface side of the hydration floor to the reactant receiving space on the reactor floor facing surface side of the hydration floor.

15. The method of claim 14, wherein the pellet bed is positioned on the pellet bed facing surface of the hydration floor, and the aqueous hydrochloric acid continuously circulates from the reactant receiving space on the reactor floor facing surface side of the hydration plate through the plurality of fluid passing holes into the pellet bed.

16. The method of claim 1, wherein the reactor tank comprises a plurality of fluid dispersing pipes positioned proximate to a bottom floor of the reactor tank.

17. The method of claim 16, wherein the plurality of fluid dispersing pipes are positioned in the pellet bed.

18. The method of claim 17, wherein the aqueous hydrochloric acid is continuously circulated through the pellet bed by being pumped into the pellet bed through the plurality of fluid dispersing pipes.

19. The method of claim 17, wherein the plurality of fluid dispersing pipes are fluidly connected to a manifold, and the manifold is fluidly connected to a pump.

20. The method of claim 1, wherein the reactor tank comprises a one or more standpipes connected to a bottom floor of the reactor tank.

21. The method of claim 20, wherein each standpipe comprises a plurality of fluid dispersing holes positioned along a length of the standpipe.

22. The method of claim 21, wherein the one or more standpipes extend from the bottom surface of the reactor tank, through the pellet bed, and out of the pellet bed.

23. The method of claim 22, wherein the end of the standpipes positioned outside of the pellet bed is in fluid communication with the reactant receiving space of the reactor tank above the pellet bed.

24. The method of claim 23, wherein the aqueous hydrochloric acid is continuously circulated through the one or more standpipes from the reactant receiving space above the pellet bed into the pellet bed through the fluid dispersing holes of the one or more standpipes.

25. The method of claim 21, wherein the aqueous hydrochloric acid is continuously circulated through the one or more standpipes using gravity.

\* \* \* \* \*